(12) United States Patent
Foster et al.

(10) Patent No.: US 7,165,060 B2
(45) Date of Patent: Jan. 16, 2007

(54) INFORMATION ACCESS, COLLABORATION AND INTEGRATION SYSTEM AND METHOD

(75) Inventors: Douglas R. Foster, Parker, CO (US); Kurt A. Heddleston, Littleton, CO (US); Jeffrey K. Moore, Aurora, CO (US); Richard Pedersen, Littleton, CO (US); Michael I. Schwartz, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 175 days.

(21) Appl. No.: 09/782,926

(22) Filed: Feb. 13, 2001

(65) Prior Publication Data

US 2002/0073059 A1    Jun. 13, 2002

Related U.S. Application Data

(60) Provisional application No. 60/182,398, filed on Feb. 14, 2000.

(51) Int. Cl.
*G06F 17/30* (2006.01)

(52) U.S. Cl. .................... 707/2; 707/10; 707/102.1; 707/104.1

(58) Field of Classification Search ............ 707/10, 707/4, 2, 1, 100, 102.1, 104.1; 709/217, 709/224, 225, 203; 345/433, 582, 589
See application file for complete search history.

(56) References Cited

U.S. PATENT DOCUMENTS

| | | | |
|---|---|---|---|
| 5,617,539 A | 4/1997 | Ludwig et al. | ........ 395/200.02 |
| 5,710,899 A | 1/1998 | Eick | ........................ 395/339 |

(Continued)

OTHER PUBLICATIONS

Computer Dictionary, Microsoft Press Third Edition, copyright 1997, pp. 257 and 430.*

(Continued)

*Primary Examiner*—Tim Vu
*Assistant Examiner*—Hung Pham
(74) *Attorney, Agent, or Firm*—Marsh Fischmann & Breyfogle LLP

(57) ABSTRACT

The present invention provides a computer implemented collaboration system and method for accessing multiple domain data sources and allowing data from those sources to be analyzed and manipulated within a multi-user distributed environment where all visualization, processing, and agent applications work collaboratively. In one embodiment, the collaboration system (10) is organized into an N-tier infrastructure including a data management tier (50), an information access tier (52), a services tier (54), and a user interface tier (56). The infrastructure of the collaboration system (10) rides upon a CORBA communications framework. The data management tier (50) includes data sources (112) and provides data management capabilities normally supplied by database management systems. The repository tier (52) is comprised of repository servers (12) and provides adaptive services to make the data maintained within the data sources (112) available to services in the services tier (54) and the client tools in the user interface tier (56). The services tier (54) is comprised of data channel servers (14), a library server (16), a participant server (24), a context server (26), and a document server (28). The services tier (54) maintains the majority of the business logic as applied to a specific domain problem. The user interface tier (56) is comprised of thin client tools (18) that allow the user to interact with the data in the data sources (112).

10 Claims, 37 Drawing Sheets

U.S. PATENT DOCUMENTS

| | | | | |
|---|---|---|---|---|
| 5,848,425 | A | 12/1998 | Lowry et al. | 707/503 |
| 5,996,003 | A * | 11/1999 | Namikata et al. | 709/205 |
| 6,034,697 | A | 3/2000 | Becker | 345/433 |
| 6,100,901 | A | 8/2000 | Mohda et al. | 345/440 |
| 6,178,382 | B1 | 1/2001 | Roederer et al. | 702/21 |
| 6,195,653 | B1 | 2/2001 | Bleizeffer et al. | 707/2 |
| 6,236,996 | B1 * | 5/2001 | Bapat et al. | 707/9 |
| 6,301,579 | B1 * | 10/2001 | Becker | 707/102 |
| 6,308,178 | B1 * | 10/2001 | Chang et al. | 707/100 |
| 6,317,777 | B1 * | 11/2001 | Skarbo et al. | 709/204 |
| 6,430,556 | B1 * | 8/2002 | Goldberg et al. | 707/4 |
| 6,463,460 | B1 * | 10/2002 | Simonoff | 709/203 |
| 6,496,190 | B1 * | 12/2002 | Driemeyer et al. | 345/433 |
| 6,505,246 | B1 * | 1/2003 | Land et al. | 709/224 |

OTHER PUBLICATIONS

Shelly Vermaat, Microsoft Office 97 Introductory Concepts and Techniques, copyright 1998 Course Technology, pp. A 2.4-A 2.18.*

Mark S. Ackerman Web Page [Retrieved on Jul. 26, 2001.] Retrieved From <http://www.ics.edu%Eackerman/> (3 Pages).

Mark S. Ackerman Web Page [Retrieved on Jul. 26, 2001.] Retrieved From <http://www.ics.uci.edu/ackerman/pub/index.html> (6 Pages).

Answer Garden: A Tool for Growing Organizational Memory Web Page [Retrieved on Jul. 26, 2001] Retrived From <http://www:ics.uci.ed/-ackerman/pub/index.html> (9 Pages).

Answer Garden 2: merging Organizational Memory with Collaborative Help Web Page [Retrieved on Jul. 26, 2001] <http://www:ics.uci.ed/-ackerman/pub/index.html> (9 Pages).

Collaborative Virtual Workspace Web Page [Retrieved on Jul. 26, 2001] Retrived From <http://cvw.mitre.org/> (4 Pages).

Group Systems.com Web Page [Retrieved on Jul. 26, 2001] Retrieved From <http://www.ventana.com/> (1 Pages)

Interoperability Sun Forum Web Page [Retrieved on Jul. 26, 2001] Retrieved From <http://www.sun.com/desktop/products/software/sunforum> (3 Pages).

NCSA Habanero Web Page [Retrieved on Jul. 26, 2001] Retrived From <http://havefun.ncsa.uiuc.edu/habanero/> (3 Pages).

InfoWorkSpace Web Page [Retrieved on Jul. 26, 2001] Retrived From <http://www.infoworkspace.com> (1 Page).

Framework for Integrated Synchronous And Asynchronous Collaboration Web Page [Retrieved on Jul. 26, 2001] Retrieved From <http://realfun.isrl.uiuc.edu/ISAAC/>(5 Pages).

Intelligence Resource Program Web Page [Retrieved on Jul. 30, 2001] Retrieved from <http://www.fas.org/irp/program/core/jiva.htm> (4 Pages).

The NCSA Software development Division (SDD) Web Page [Retrieved on Jul. 26, 2001] Retrieved From <http://archive.ncsa.uiuc.edu/SDG/Homepage/Joule.html> (1 Page).

SDSC Mice Molecular Interactive Collaborative Environment Web Page [Retrieved on Jul. 30, 2001] Retrieved From <http://mice.sdsc.edu/> (1 Page).

Windows NetMeeting Web Page [Retrieved on Jul. 26, 2001] Retrieved From <http://www.microsoft.com/windows/netmeeting/> (2 Pages).

netWorkPlace Web Page [Retrieved on Jul. 30, 2001] Retrieved From <http://archive.ncsa.uiuc.edu/Edu/ITG/netWorkPlace/> (1 Page).

NCSA net WorkPlace A Collaborative Workspace Web Page [Retrieved on Jul. 30, 2001] Retrived From <http://www.ncsa.uiuc.edu/People/fbaker/netWorkPlace/Slide1.html> (1 Page).

Prof. Simon M. Kaplan Web Page [Retrieved on Jul. 26, 2001] Retrieved From <http://archive.dstc.edu.au/TU/staff/simon.html> (2 Pages).

Collaboration Web Page [Retrieved On Jul. 26, 2001] Retrieved From <http://www.webwisdom.com/Technologies/collaboration.html> (1 Page).

TeamWave Web Page [Retrieved on Jul. 26, 2001] Retrieved From <http://www.teamwave.com/> (1 Page).

Joint Collaboration Services Web Page [Retrieved on Jul. 26, 2001] Retrieved From <http://jcs.mitre.org/> (1 Page).

* cited by examiner

THIN CLIENTS INTERACT WITH DATA
REPRESENTED BY A DOCUMENT

DOMAIN DATA
IS EXTENDED FOR
VISUALIZATION AND
CONTROL

- VISUALIZATION AND CONTROL PROPERTIES (E.G., COLOR, SELECTION, SYMBOL, ETC.) BECOME PART OF THE DATA
- CLIENT VIEWERS FOCUS ON PRESENTATION OF INFORMATION
- CLIENTS DO NOT REQUIRE LOGIC DEALING WITH COLLABORATION
- CLIENTS DO NOT REQUIRE COMPLEX LOGIC TO ACCESS DATA

OPS PICTURE-SIGNALS MAP VIEWER

SIG-60 SIG-50
SIG-8 SIG-6
SIG-9 SIG-10 SIG-7
SIG-30 SIG-50 SIG-20
SIG-50
SIG-10

FILE EDIT VIEWS TOOLS EDIT
- SAM-AAA INTEL.RM-KOREA
  - NV
  - VAT
  - OPS PICTURE
    - DOCUMENTS
    - THREAT SIGNALS
    - AIRBORNE SIGNALS
    - TADIL TRACKS
    - KOREAN FACILITIES
    - WBCOMMS NETWORK
    - OPERATIONS CHAT
    - PEOPLE
      - DOUG
      - BOB

DISPLAYING
DOCUMENTS
USING VARIOUS
TOOLS

FIG.4

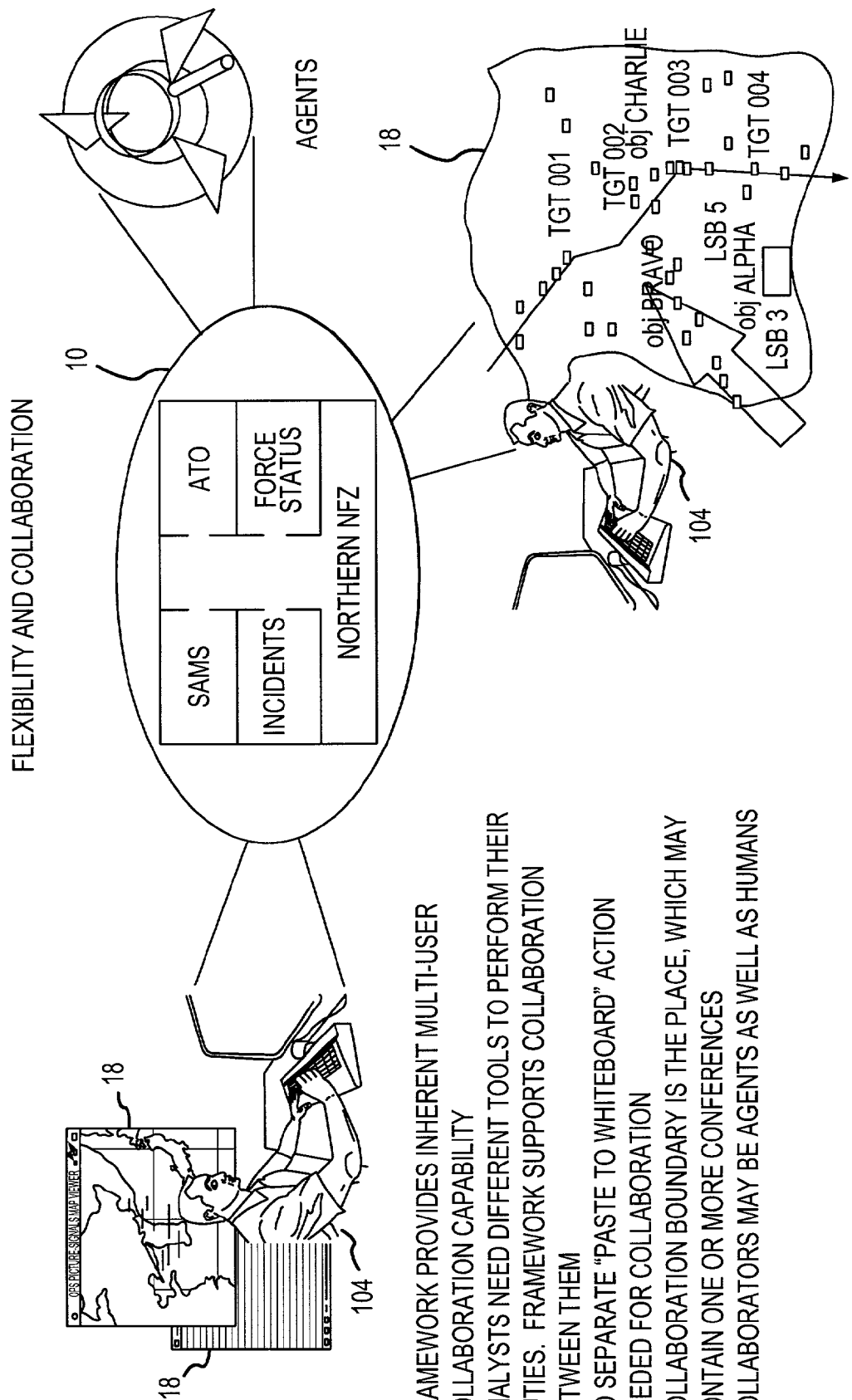

FIG.6

- FRAMEWORK PROVIDES INHERENT MULTI-USER COLLABORATION CAPABILITY
- ANALYSTS NEED DIFFERENT TOOLS TO PERFORM THEIR DUTIES. FRAMEWORK SUPPORTS COLLABORATION BETWEEN THEM
- NO SEPARATE "PASTE TO WHITEBOARD" ACTION NEEDED FOR COLLABORATION
- COLLABORATION BOUNDARY IS THE PLACE, WHICH MAY CONTAIN ONE OR MORE CONFERENCES
- COLLABORATORS MAY BE AGENTS AS WELL AS HUMANS

ARCHITECTURAL STRATEGY

KEY REFERENCE ARCHITECTURES
- OBJECT MANAGEMENT ARCHITECTURE (OMA)
  - OPENGIS, COSSERVICES
- COE LAYERED ARCHITECTURE
- UCA CRYPTOLOGIC FRAMEWORK
- USIGS
  - GIAS

KEY DATA MODELS
- SOM, MIDB, JCDB, ASAS, L245, ECDS, TEXTA

ARCHITECTURAL PATTERNS
- LAYERED ARCHITECTURE
- DATA CENTRIC ARCHITECTURE
  - INFORMATION MANAGEMENT FRAMEWORK
  - INTERACTIVE ANALYSIS FRAMEWORK
- MISSION MANAGEMENT ARCHITECTURE
  - TASK MANAGEMENT FRAMEWORK
  - RESOURCE MANAGEMENT FRAMEWORK

COTS SW INFRASTRUCTURE
- JAVA/C++
- CORBA
- ENTERPRISE JAVA BEANS
- RDBMS/ODBMS
- MICROSOFT WINDOWS
- WEB SERVER/BROWSER
- XML/DOM

COTS HW
- UNIX SMP SERVER
- NT WORKSTATIONS

FIG.8

IMPORTANCE OF DATA-CENTRIC COLLABORATION FRAMEWORK

- FRAMEWORK IS APPLICABLE TO MOST DOMAINS
- SMALL TOOLS EXTEND OVERALL CAPABILITY
  - BUILD DOMAIN OR ANALYST SPECIFIC TOOLS—NOT SYSTEMS
  - ADDING SINGLE COLLABORATIVE CAPABILITIES RESULTS IN EXPONENTIAL GROWTH OF OVERALL SYSTEM CAPABILITY
- COLLABORATION INTEGRAL TO FRAMEWORK
  - INSTEAD OF PASTING IMAGES ONTO A WHITEBOARD, COLLABORATE ON THE TOOL ITSELF USING WHITEBOARDING LAYER
  - NO SPECIAL LOGIC NEEDED IN TOOLS TO SUPPORT COLLABORATION
- SUPPORTS LEGACY APPLICATIONS
  - DATA IS SHARED AND NOT REPLICATED, SO CHANGES TO THE DATA BY LEGACY TOOLS PROPAGATE TO COLLABORATIVE TOOLS.

FIG.14

LIST VIEWER

- SORTING
- ROW SELECTION
- ROW COLORING
- ROW HIDING
- CHOOSE ATTRIBUTES TO VIEW

| ☐ OPSPICTURE-KOREANFACILITIES-DATALIST | | | | | |
|---|---|---|---|---|---|
| SITECODE | NAME | COUNTRY | LATITUDE | LONGITUDE | THREAT |
| KN00657 | CHOOK | KN | 39.233333 | 127.05 | 3 |
| KN00561 | CH'ILTAE | KN | 39.466667 | 127.05 | 6 |
| KN00017 | P'ALBONG | KN | 39.416667 | 127.066667 | 4 |
| KN00492 | CH'ANGMOK | KN | 39.433333 | 127.066667 | 5 |
| KN00250 | ISDU | KN | 39.562315 | 127.083333 | 8 |
| KN00228 | PYONGSAN | KN | 39.233333 | 127.1 | 0 |
| SC00002 | 232 AIR CO | KN | 38.4 | 127.1 | 10 |
| KN00380 | PYONGP'UN | KN | 39.993333 | 127.133333 | 4 |
| KN00227 | PYONGSANG | KN | 39.966667 | 127.166667 | 6 |
| KN00241 | PAEAM | KN | 39.683333 | 127.183333 | 5 |
| KN00242 | PAEBAWL | KN | 39.683333 | 127.183333 | 4 |
| KN00250 | CHOOOMIN | KN | 17.430562 | 127.9 | 8 |
| KN00296 | PAEKKONG | KN | 38.466667 | 126.566667 | 1 |
| KN00478 | CH'ANGGYE | KN | 39.466667 | 126.566667 | 2 |
| KN00044 | PANMUU | KN | 37.895555 | 126.564555 | 8 |
| KN00045 | RASDASS | KN | 38.956546 | 127.566667 | 7 |
| KN00292 | PAEKHWAD | KN | 37.95 | 126.583333 | 6 |
| KN00425 | CH'AERYON | KN | 37.833333 | 126.6 | 2 |
| KN00257 | PAEGO | KN | 38.433333 | 126.6 | 1 |
| KN00521 | CH'ARYONG | KN | 39.366667 | 126.6 | 2 |
| SC00004 | BQ12YSA | KN | 37.8 | 126.6 | 10 |
| KN00030 | PANCH'ON | KN | 37.8 | 126.633333 | 5 |
| KN00712 | CHODEDAM | KN | 39.56 | 126.633333 | 7 |
| KN00019 | PALCHACH'ON | KN | 37.966667 | 126.633333 | 3 |
| KN00323 | PAEKTONGUM | KN | 37.933333 | 126.65 | 4 |
| KN00103 | PONGAM | KN | 38.965333 | 126.65 | 8 |
| KN00493 | CH'ANGNAE | KN | 37.833333 | 126.666667 | 4 |
| KN00195 | PYONGCH'A | KN | 37.916667 | 126.666667 | 4 |

FIG.21

CHAT TOOL

- CHAT SUPPORTS MULTIUSER CONVERSATIONS FROM MULTIPLE CONFERENCES IN MULTIPLE CONTEXTS

- PEOPLE CONNECT TO A DOCUMENT AND COMMUNICATE

- PEOPLE IN THE SAME CONFERENCE SEE THE SAME VISUALIZATION PROPERTIES LIKE COLOR AND VISIBILITY OF PARTICIPANTS INPUTS

- CONVERSATIONS ARE PERSISTENT OVER TIME

18

OPSPICTURE-OPERATIONSCHAT-CHATVIEWER

DOUG: TADIL IS REPORTING AN INBOUND PLANE
DOUG: DOES ANYONE KNOW WHAT TYPE OF PLANES THESE ARE
BOB: I GOT AN ELINT HIT AGAINST TRACK #52. IT LOOKS LIKE IT IS A MIG FIGHTER AIRCRAFT
SHIRLEY: BASED ON THE COMMS BETWEEN THE TWO AIRCRAFT THEY ARE PLANNING TO CROSS THE BOARDER AND PULL OUR FIGHTERS INTO A TRAP
SHIRLEY: THEY HAVE A NETWORK OF SAM'S READY TO TAKE OUT OUR PURSUING FIGHTERS
SHIRLEY: HAVE WE SEEN ANY FIGHTER ACTIVITY?
BOB: I JUST GO AN SA-6 TT HIT ON THE SUNAN SITE. WE HAD BETTER LET THE AWACS KNOW, AND AMPLIFY THOSE TADIL TRACKS WITH OUR ID INFORMATION

FIG.22

INFORMATION ACCESS, COLLABORATION AND INTEGRATION SYSTEM AND METHOD

RELATED APPLICATION INFORMATION

This application claims the benefit of U.S. Provisional Application Ser. No. 60/182,398 entitled "Collaboration System Infrastructure For Communication Between Computer System Users" filed on Feb. 14, 2000.

FIELD OF THE INVENTION

The present invention relates generally to the field of computer systems and programs, and in particular to a computer implemented collaboration system and method that provides an infrastructure for access to multiple domain data sources, and allows data from those sources to be analyzed and manipulated within a multi-user distributed environment where all visualization, processing, and agent applications work collaboratively.

BACKGROUND OF THE INVENTION

Referring to FIG. 1, older data access and analysis systems were generally built as large application programs where most, if not all, system capabilities were tightly coupled within the application. Having one large application can be difficult and costly to maintain. Changes to a single capability within the application can have a ripple effect throughout the source code requiring extensive changes to other areas of the application. Repeated modification to the application can result in a system that is so large and complex that enhancements become too cost prohibitive to implement. Such large data access analysis systems have typically been built as a result of analysis that failed to identify an existing infrastructure that met the needs of future collaborative systems. To summarize, with present data access and analysis systems, tools are generally restricted to a specific data source, there is difficulty in analyzing data from various sources, the systems are costly to enhance, and there is an inability to collaborate on multiple data sources at the same time to solve a problem.

SUMMARY OF THE INVENTION

Accordingly, one object of the present invention is to provide a collaborative system with simplified access to multiple domain data sources.

Another object of the present invention is to provide a collaborative system with full lifecycle management.

A further object of the invention is to provide a collaborative system that allows manipulation of dissimilar data using common tools.

Yet another object of the present invention is to provide a collaborative system providing for the simultaneous manipulation of various data sources within the same tool.

A still further object of the present invention is to provide a collaborative system environment that provides a path for new systems to be developed by making maximum use of legacy system capabilities.

An additional more object of the present invention is to provide for new capabilities to be added to existing systems without requiring additional investment in the old system architectures.

Another additional object of the present invention is to provide a collaborative system with system scalability, extensibility, and maintainability within a collaborative framework exceeding that provided by existing technologies.

One more object of the present invention is to provide a collaborative system having an infrastructure that is domain independent.

Yet one more object of the present invention is to allow collaboration groups solving different problems to apply different visualization and control properties to their data collections than other collaboration groups.

These and other objects and advantages are realized by various aspects of the present invention. According to one aspect of the present invention, a computer implemented collaboration system includes at least one repository server, at least one client tool, and at least one data channel server. The repository server is associated with at least one data source and is enabled for accessing data items within its associated data source(s) using access methods native to its associated data(s) source. The client tool is enabled for displaying the data items within the data source(s) associated with the repository server on a user terminal connectable with the computer implemented collaboration system. The data channel server provides an interface between the repository server and the client tool. In this regard, the repository server, the client tool, and the data channel server may be implemented within a Common Object Request Broker Architecture (CORBA) framework. The computer implemented collaboration system also includes at least one extended property such as, for example, a visualization property or a control property for use in displaying the data items with the client tool. The extended property is associated with each data item within the data source(s) and is maintained by the data channel server. In this regard, the extended property may be maintained in the data channel server in a directed a-cyclic graphical form.

The computer implemented collaboration system may further include a query viewing client tool and a library server. The query viewing client tool is enabled for use in constructing queries (e.g., standing or static queries) for selecting data from the data source(s) meeting particular criteria. The library server provides an interface between the query viewing client application and the repository server. The computer implemented collaboration system may also include a conference manager client tool enabled for managing communication between multiple user terminals connectable with the computer implemented collaboration system.

According to another aspect of the present invention, a computer implemented method for collaborative access to and manipulation of data items within at least one data source includes the step of creating a document representing data items within the data source(s). In this regard, the document may be created by executing a static query of the data source(s) to identify data items meeting specified query criteria at a moment in time, or evaluating the query continually, either periodically or as new data arrives, providing a standing query of said the data source(s) to identify data items meeting specified query criteria.

After it is created, the document is associated with at least one conference that is accessible to at least one user terminal. In this regard, the document may be associated with the conference by using a pointing device to drag and drop a representation, displayed on the user terminal, of the document onto a representation, displayed on the user terminal, of said the conference.

The method also includes the steps of displaying the data items within the document on the user terminal user terminal and the step of maintaining an instance of at least one extended property associated with each data item represented in the document. The instance of the extended property is only available within the conference with which the document is associated. The extended property may, for example, comprise a visualization property (e.g., a preferred color or symbol) or a control property (e.g., a reporting task) for use in displaying the data items on the user terminal in the displaying step.

The present invention extends the scope of collaboration beyond simple whiteboard, audio chat, and video where all participants have exactly the same view of the data, from the same perspectives, identical picture, and scale. In the present invention, this mode is supported, but others are as well. Depending on viewer policy, participants have the ability to see the same data in the same presentation; have the ability to share scale and perspective, but allow different views sizes and locations; and have the ability to use different tools, different perspectives, and different scales while still working together on the same data.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 4 is a flow chart illustrating how a client interacts with data on a document;

FIG. 6 is a flow chart illustrating flexibility and collaboration;

FIG. 8 is a flow chart of the architectural strategy;

FIG. 14 is a chart summarizing the importance of having a data-centric collaboration network;

FIG. 21 illustrates the output in a list viewer;

FIG. 22 illustrates the chat tool capability;

DETAILED DESCRIPTION

Figure 1:
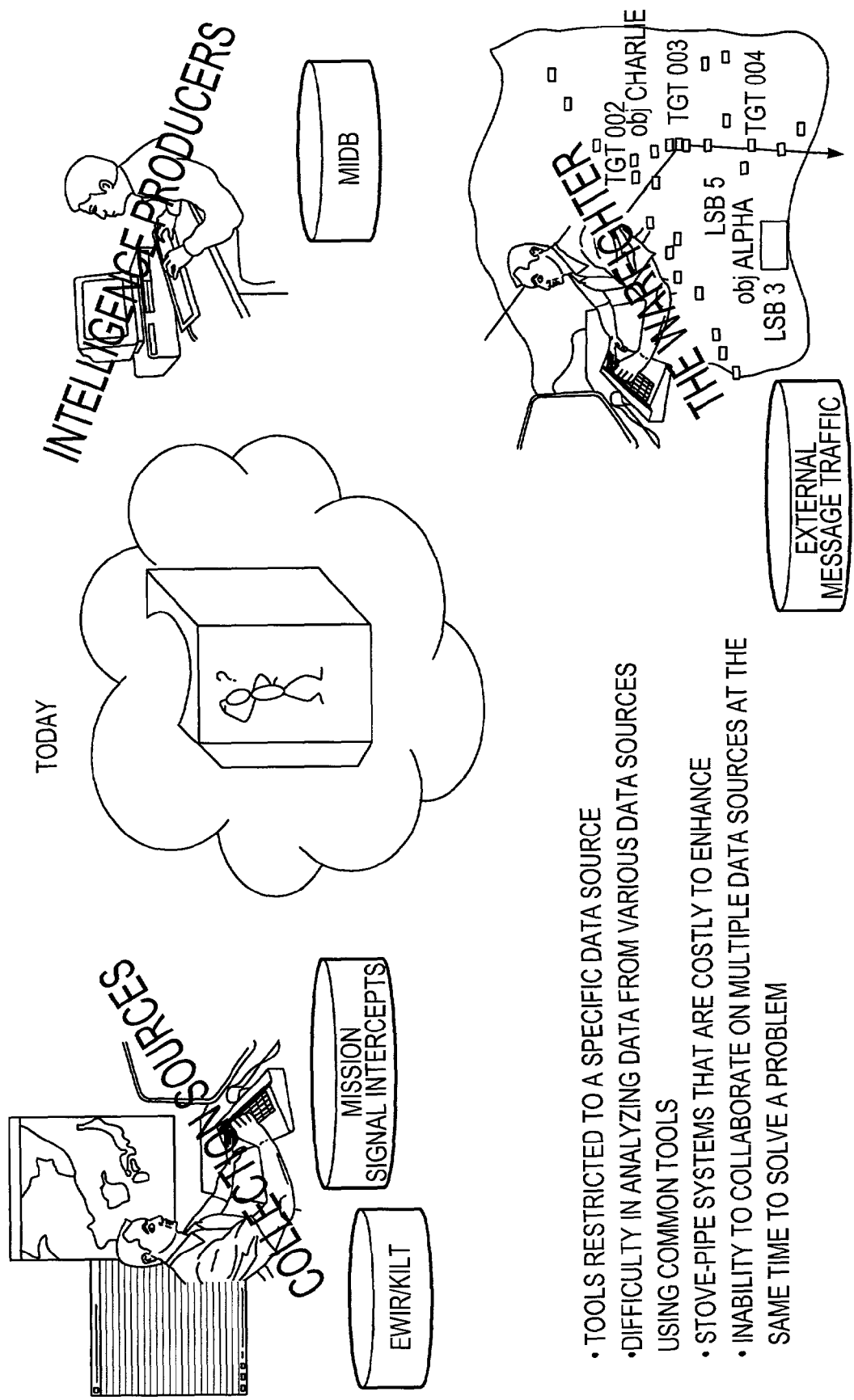
FIG. 1 illustrates limitations of present collaborative systems.

Referring generally to FIGS. 2–10, the computer implemented collaboration system 10 of the present invention incorporates a component-based infrastructure providing an architectural foundation for developing/incorporating advanced capabilities into new or legacy systems. The infrastructure incorporates a data centric approach where domain information is extended with control and visualization attributes and presented as self-describing objects. Data access is provided through industry standard interfaces adding to the ease of integration with legacy and commercial applications. The collaboration system builds on a data centric philosophy to provide key foundation frameworks for data access, collaboration, and component integration.

The collaboration system infrastructure is designed to integrate with existing collaborative products such as, for example, Net Meeting, Sun Forum, CVW, InfoWorkspace and Placeware, and to make available additional collaborative capabilities not provided by existing tools. Specifically, the collaboration system infrastructure provides access to multiple domain data sources, and allows data from those sources to be analyzed and manipulated within a multi-user distributed environment where all visualization, processing, and agent applications work collaboratively.

The collaboration system is a fully distributed architecture allowing each service to be configured and executed anywhere within the network. It is built upon an architectural framework including CORBA and Java. The infrastructure is platform independent with demonstrated operation under heterogeneous operating environments consisting of Microsoft® Windows 9x, Windows NT, Windows 2000, and Unix (e.g., Solaris 2.x). The collaboration system is based on established and emerging government and commercial open standards including the Geospatial Information Access Specification (GIAS), OpenGIS, and Document Object Model (DOM). All interfaces to the collaboration system infrastructure are provided through standard Interface Definition Language (IDL) ensuring adaptability to legacy systems written in Java, C, C++, Ada, or any other language with IDL bindings.

Still referring generally to FIGS. 2–10, the collaboration system data access framework incorporates an adaptive repository layer that accesses the domain data through the access methods native to the data source. This enables data from any data source (real-time data feed, object data base, relational database, file system, etc.) to be accessed from the infrastructure. The repository approach is non-intrusive such that domain data sources do not need to be modified in any way. The repository acts as a gateway to the native data. The repository is responsible for describing the data and making the data available through industry standard interfaces. This alleviates the need for client applications to have any knowledge of data location or specific access logic unique to the data source.

Extensibility and flexibility are key attributes of the collaboration system infrastructure. Data is made available in a self-describing format such that client applications learn about the data and are able to manipulate the data without any a'priori knowledge of its intrinsic structure. Client viewers are subsequently able to manipulate data from a variety of different domain sources without requiring any specialized software. Therefore, adding a new data source or changing the structure of an existing data source requires no changes to the infrastructure or client applications. In addition, adding client applications that provide extended capabilities are able to manipulate data within any available data source.

Figure 2:
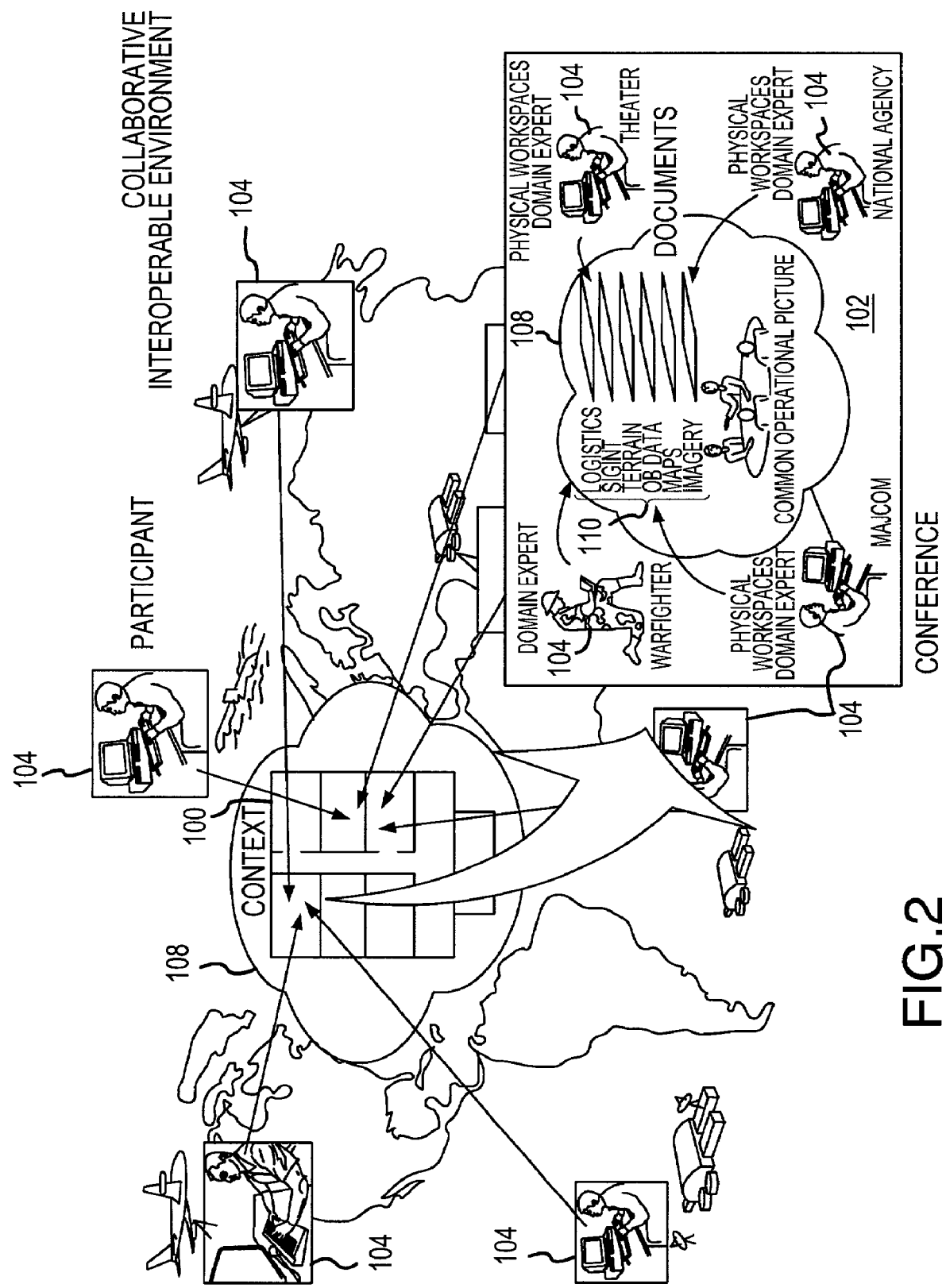
FIG. 2 is a flow chart of the collaborative environment.

Referring more specifically to FIG. 2, there is shown an overview of a collaborative interoperable context 100 that is provided by the computer implemented collaboration system 10 of the present invention. Within the collaborative interoperable context 100 one or more conferences 102 are provided in which multiple participants 104 are able to collaboratively access and manipulate data from one or more data sources at the same time to solve a problem. The participants 104, who may be geographically remote from one another, access the conferences 102 via user terminals 106 connected to a data network 108. The participants 104 to a conference 102 are able to access and manipulate the data through one or more documents 110 that represent the data sources. For example, as is illustrated, within a conference 102 of a context 100 relating to an intelligence gathering and analysis operation there may be documents 110 representing logistics data, signal intelligence data, terrain data, map data, image data and the like, together providing a common operational picture. It will be appreciated that although the illustrated context 100 is of an intelligence related nature, the collaborative interoperable context 100 may relate to many other non-military related matters.

The context 100 provides a higher order organization for the conference 102. A context 100 may be a floor in a building, a region within a country or a conference room. Contexts 100 may be entered by participants 104 as a room would be entered and conferences 102 can be established. Conferences 102 provide the context 100 to drop documents 110 for collaboration. A document 110 dropped within a conference 102 will have an associated data channel that will maintain and make available the collection of information represented by the document 110 as well as any extended visualization or control properties.

Figure 3:
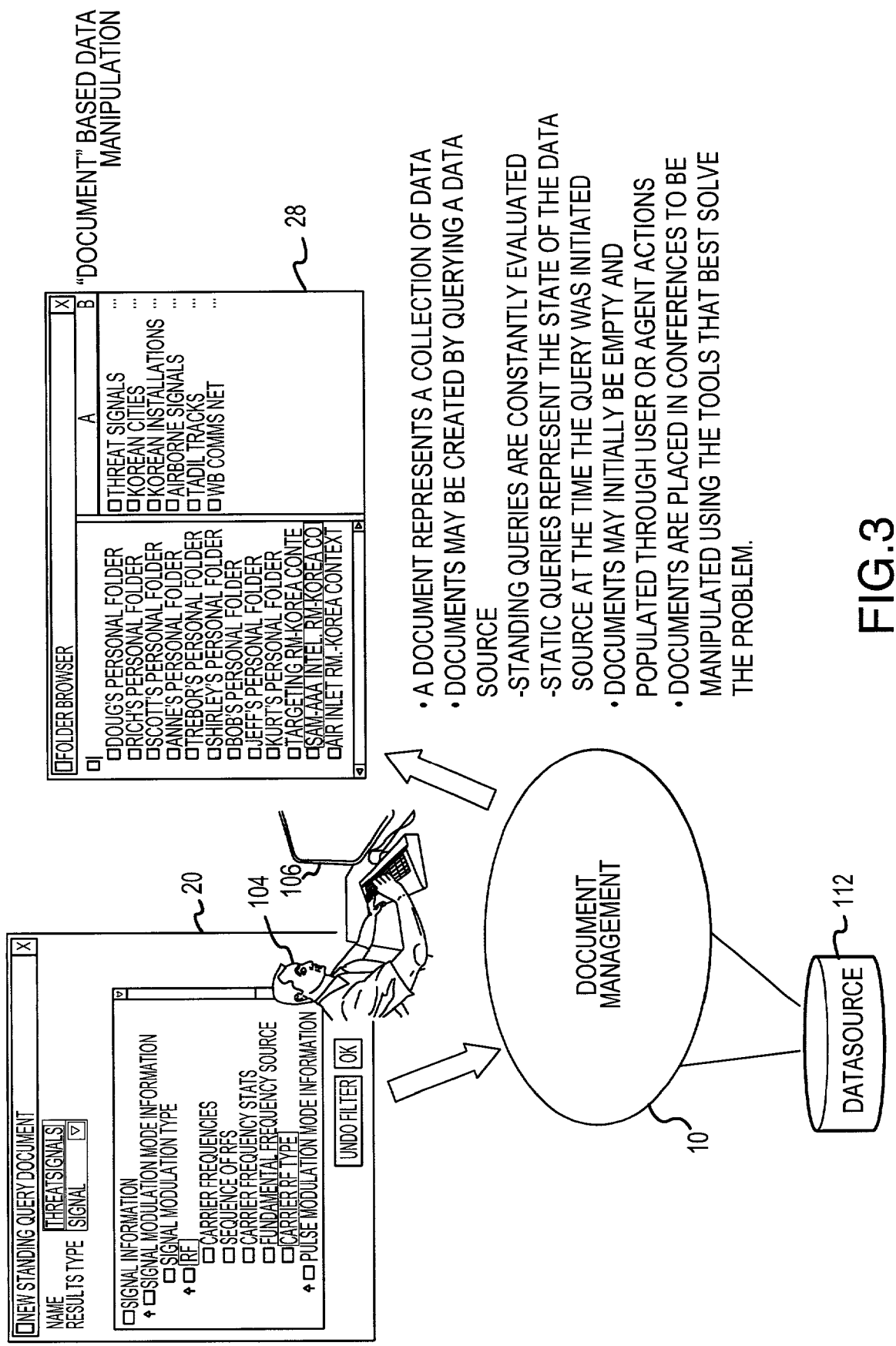
FIG. 3 is an overview of how clients participate with a document.

Referring now to FIGS. 2–4, each document 110 represents data from a corresponding data source 112. A document 110 may be created by performing queries against the corresponding data source 112 or it may be created as an empty document 110 to be populated using interactive tools. In the former case, the query may be one of two types, standing or static. A standing query acts as an agent, constantly being evaluated to ensure that the collection of data represented by the document 110 is up-to-date relative to the query specification. As changes are made to the corresponding data source 112, the document 110 is updated and those updates are propagated to any viewer that may be displaying the document 110. A static query represents a snapshot of the data in the corresponding data source 112 at the time that the query was invoked. The document 110 representing the corresponding data source 112 is not updated when the data source 112 changes but may be manipulated by other software agents or individuals interacting with the document 110 directly.

Once created, one or more documents 110 may be placed into a conference 102 by a participant 104 (e.g., by dragging a document 110 and dropping it into a conference 102), then opened and acted upon by various client applications, such as display/processing tools (e.g., map viewers, list viewers, analytical packages, etc.). Within each conference 102, the domain data (i.e., the data from the corresponding data sources 112 represented in the documents 110) is extended through the addition of visualization and control properties such as, for example, an associated color and/or symbol for displaying the data or an indication of what data has been selected by a participant 104 using a client application. The visualization and control properties become part of the data represented in the documents 110 allowing the client applications to focus on the presentation of the information rather than needing complex logic for accessing the data or logic dealing with collaboration between the participants 104 to a conference 102. Documents 110 may be graphically overlaid or textually combined to show relationships between data from different data sources 112 and to extract information that could not be extracted by viewing the data separately. Documents 110 can be attached to tasks and may be passed from place-to-place or person-to-person following a process.

Figure 5:
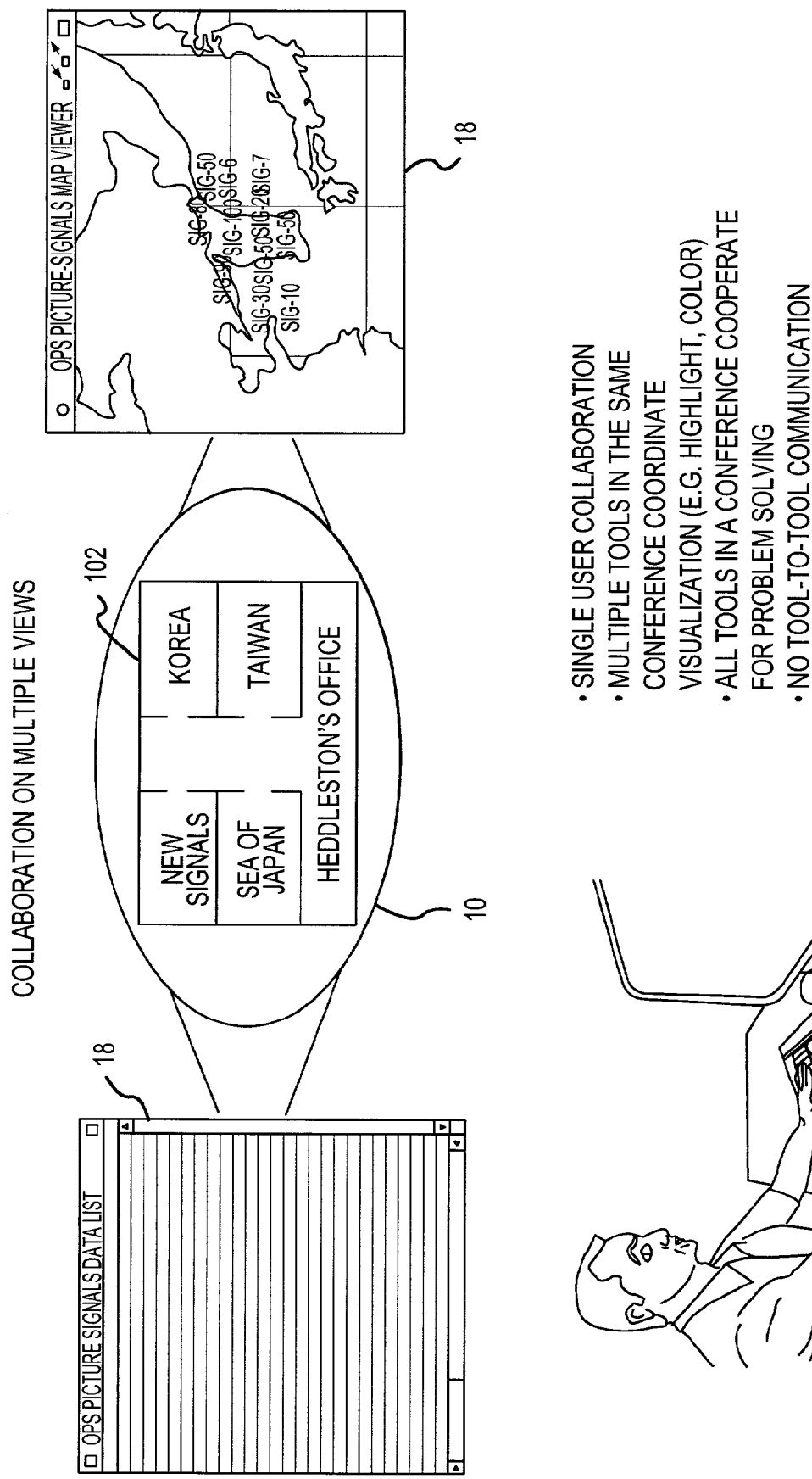
FIG. 5 illustrates the collaboration process on multiple views.
Figure 7:
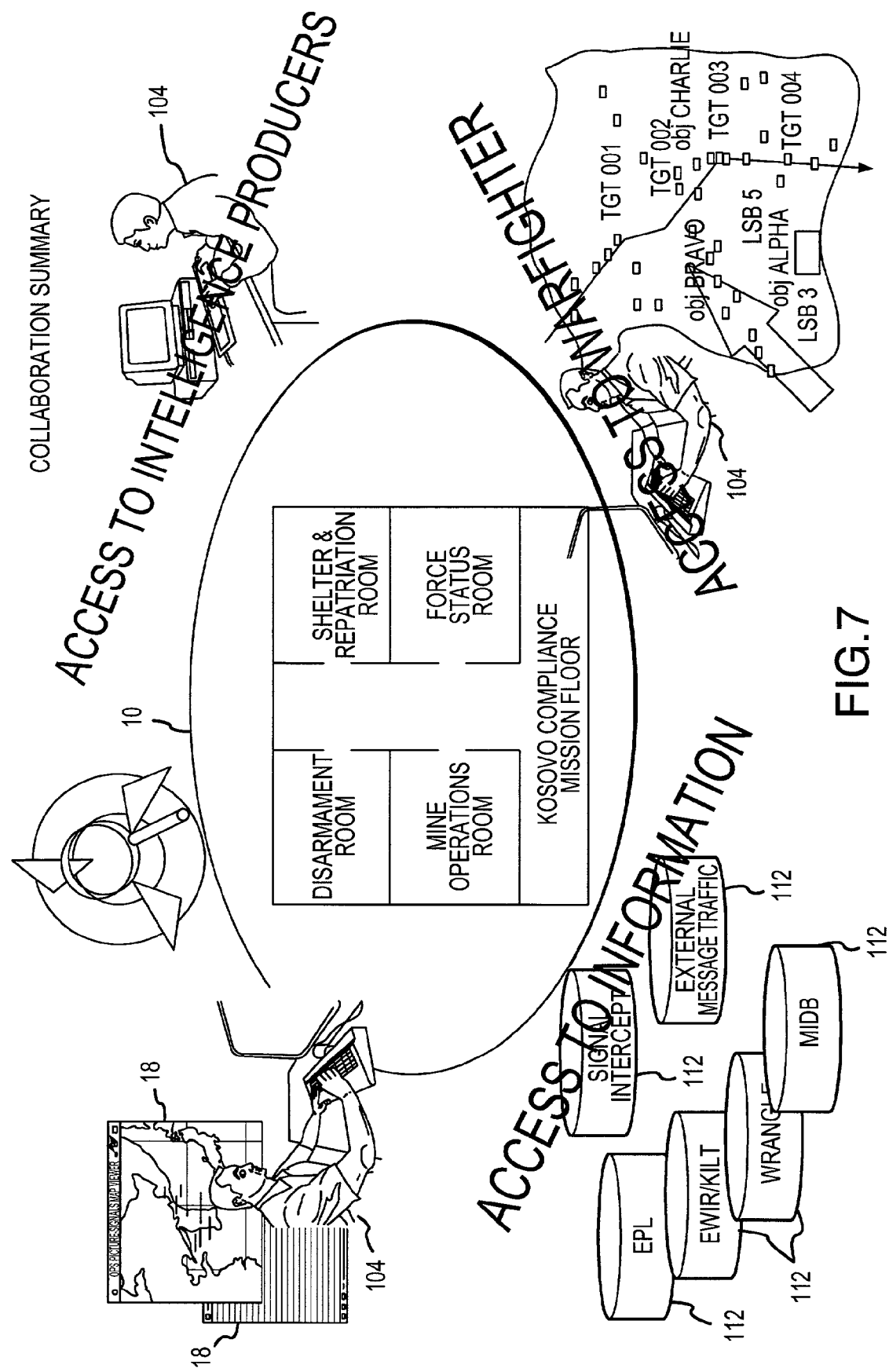
FIG. 7 is a pictorial summation of how a client accesses information.

Referring now to FIG. 5, the computer implemented collaboration system 10 of the present invention provides for single user collaboration. Single user collaboration is a concept used to describe a single user interacting with multiple visualization or data processing tools against one or more documents 110 within the collaborative context 100. By having all domain, control, and visualization properties available through the collaboration system 10, collaborative tools work together to extract information from the data and cooperate for problem solving. It is important to note that in accordance with the present invention, there is no direct communication between the tools.

Referring now to FIG. 6, the computer implemented collaboration system 10 of the present invention also provides for multi-user collaboration. Multi-user collaboration is an extension of the single user collaboration environment to include multiple participants 104. The collaborative framework of the collaboration system 10 provides inherent multi-user collaboration in that no specialized logic is required for client applications to act collaboratively. Multiple users enter conferences to combine and apply various human knowledge, agent/application processing, and data resources to solve a problem. The computer implemented collaboration system 10 of the present invention permits collaboration between multiple users without requiring that images be pasted onto a common "whiteboard" in order for the multiple users collaborate on the same data. Instead, collaboration is accomplished directly within the tools. Additionally, collaboration between multiple users is possible without requiring the incorporation of special logic within the tools. It will be appreciated that in addition to human collaborators, there may be software agents involved in the collaborative process.

Figure 9:
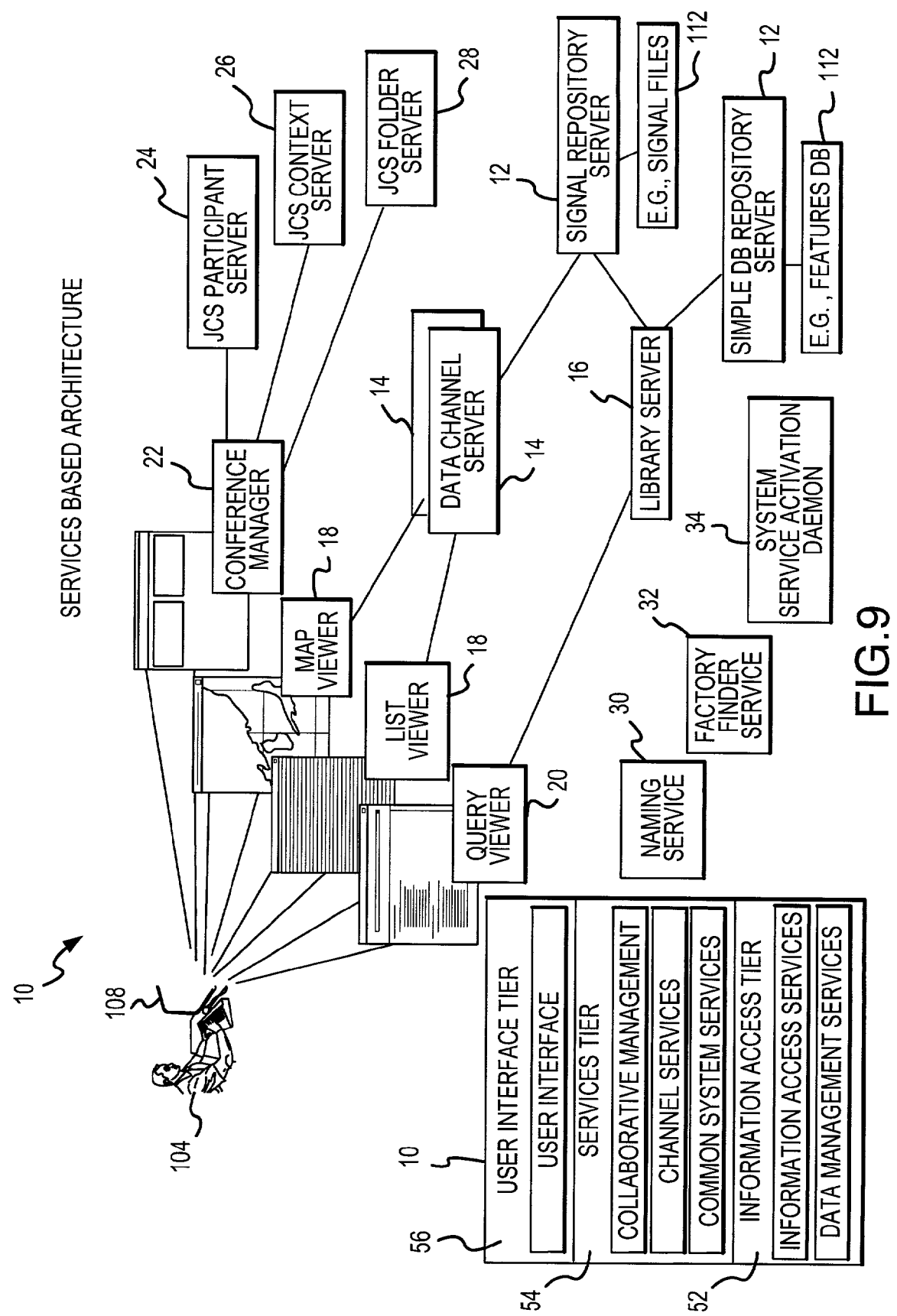
FIG. 9 is a flow chart of the services based architecture.

Referring now to FIG. 9, a block diagram of the components of one embodiment of a collaboration system 10 in accordance with the present invention is shown. The collaboration system 10 includes one or more repository servers 12, one or more data channel servers 14, a library server 16, one or more client data viewing tools 18 (e.g., a list viewer tool, a map viewer tool, or an X-Y viewer tool), a query viewer tool 20, and a conference manager tool 22. Each repository server 12 is enabled for accessing data within a corresponding data source 112, using data access methods native to its corresponding data source 112. It will be appreciated that since the repository servers 12 provide access to the data sources 112, the client data viewing tools 18 do not need to be enabled for accessing the data within the data sources 112, and therefore require no specific knowledge of the nature of the data within the data sources 112. The data channel servers 14 manage data centric channels within which extended data properties (e.g., visualization and control properties) are maintained. Maintaining the extended properties of the data within the data channel servers 14 rather than within the client data viewing tools 18 allows for single user and multiple user collaboration without requiring that the client data viewing tools 18 to be enabled for direct communication with one another or have any knowledge of each other.

The collaboration system may include additional management components supplied by the MITRE Corporation as part of the Joint Collaborative Services (JCS) Project, such as a JCS participant server 24, a JCS context server 26, and a JCS document server 28. The participant server 24 maintains a listing of all authorized participants 104 as well as the processing state of the participants 104 and the conferences 102 that they have entered. The document server 28 provides interfaces to manipulate documents 110 within folders. Interfaces provide for creation and deletion of documents 110 as well as folder management to allow organization of documents 110 in a hierarchical storage structure. The context server 26 provides the interfaces to manage collaboration contexts 100 and conferences 102 within those contexts 100. The collaboration system 10 may also include such standard CORBA services as a naming service 30, a factory finder service 32 and a system service activation daemon 34.

Figure 10:
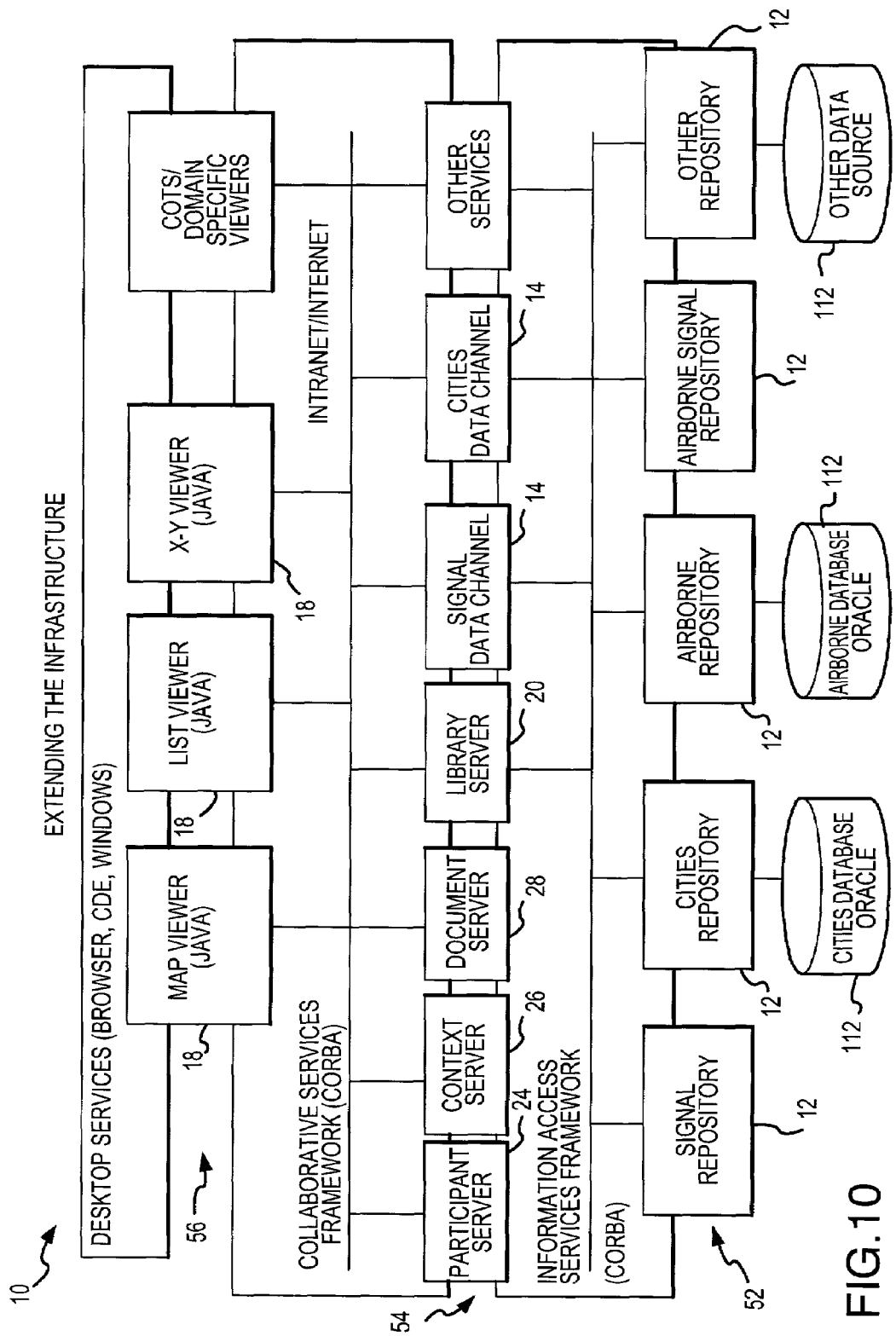
FIG. 10 is a flow chart of the system to extend the infrastructure.

Referring to FIG. 10, the components of the collaboration system 10 are organized into an N-tier infrastructure including a data management tier 50, an information access tier 52, a services tier 54, and a user interface tier 56. Each tier is made up of components accessed and manipulated through a defined interface. The infrastructure of the collaboration system 10 rides upon a CORBA communications framework. The data management tier 50 includes and the data sources 112 (e.g., a cities database, an airborne database). The data management tier 50 provides the data management capabilities normally supplied by database management systems.

The repository tier 52 is comprised of the repository servers 12 (e.g., a signal repository, a cities repository, an airborne repository, an airborne signal repository). The repository tier 52 provides the adaptive services to make the data maintained within the data sources 112 available to the services in the services tier 54 and the client tools in the user interface tier 56. Each repository server 12 in the repository tier 52 interacts with its associated data source 112 using the data source's 112 native access methods. This allows virtually any data source 112 to be integrated with the infrastructure without requiring modifications to the rest of the infrastructure services or client tools. The repository servers 12 in the repository tier 52 perform two functions. They act as proxies to execute service requests using their associated data source's 112 native access methods, and they provide requested data to the infrastructure in self-describing structures.

Requests are made to the repository servers 12 in two ways: standing queries and static queries. Upon initialization, each repository server 12 interrogates its associated data source 112 to extract the structure of the data maintained within it. This definition is described as a feature type. Each repository server 12 then registers with the library server 16 providing the supported feature type and the type of queries that the repository can perform (blank, standing, static). When a query is executed, the result of the query is transformed in to a self-describing data structure made accessible through a component called a "feature collection."

Figure 35:
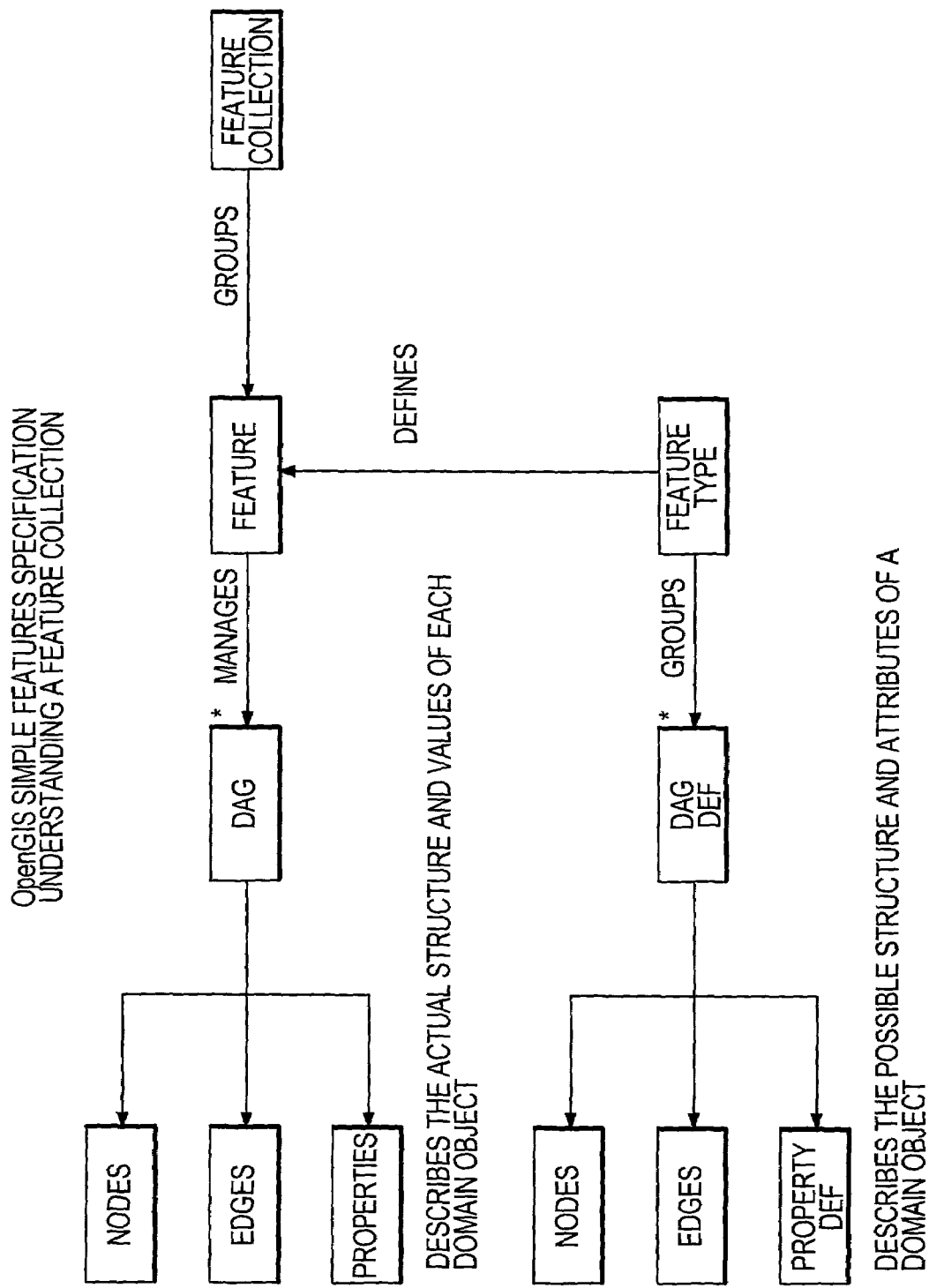
FIG. 35 illustrates the components that make up a "feature collection"

The repository servers 12 are responsible for accepting requests for information, executing those requests and then managing the resulting collection of information. The collection of information resulting from a query, called a "feature collection," is made available in a self-describing format. The information and the access methods to manipulate the collection are modeled after the "Simple Features Specification" developed by the Open GIS Consortium. FIG. 35 illustrates the components that make up a "feature collection".

Figure 36:
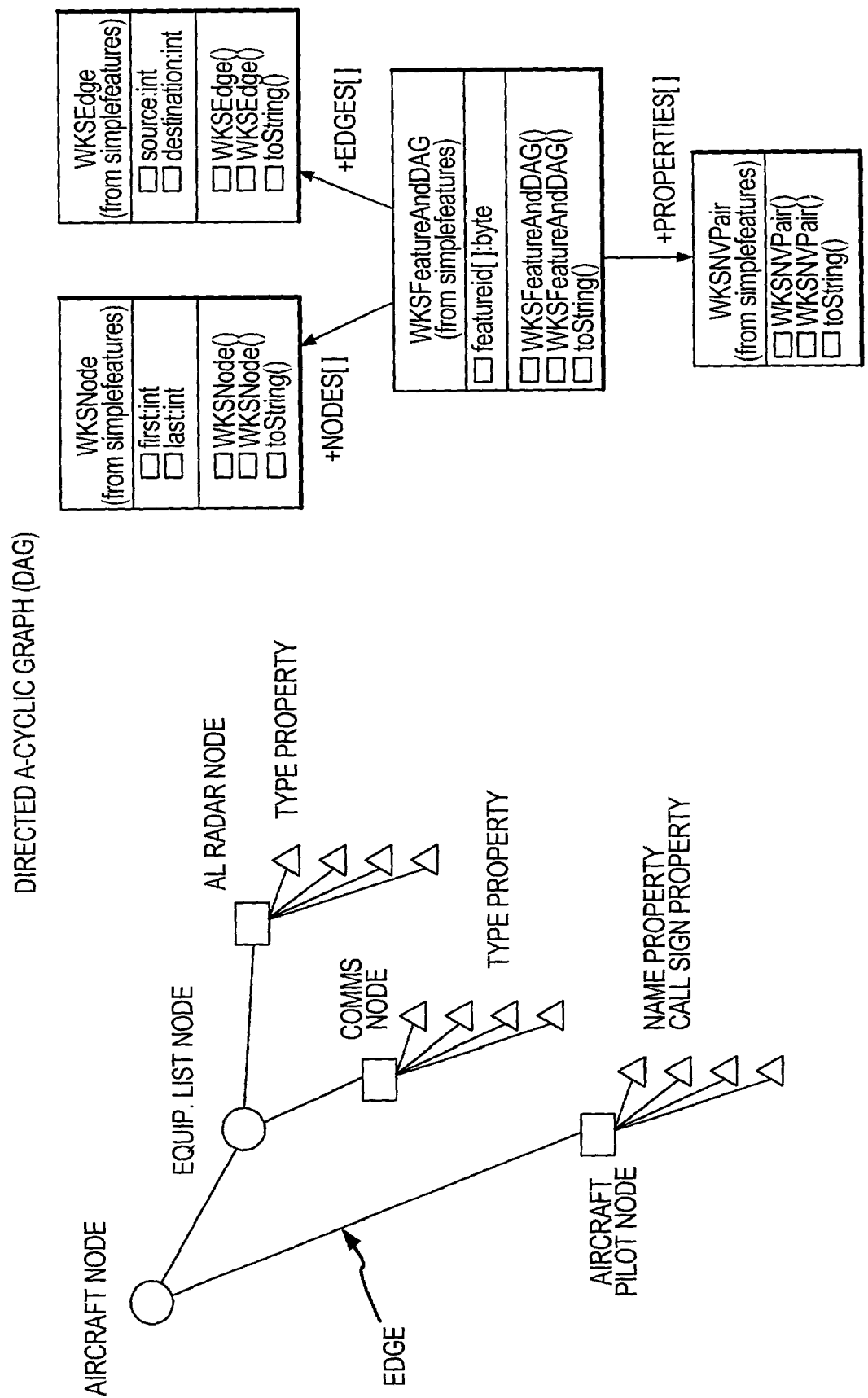
FIGS. 36–37 illustrate the directed a-cyclic graph data structure format.
Figure 37:
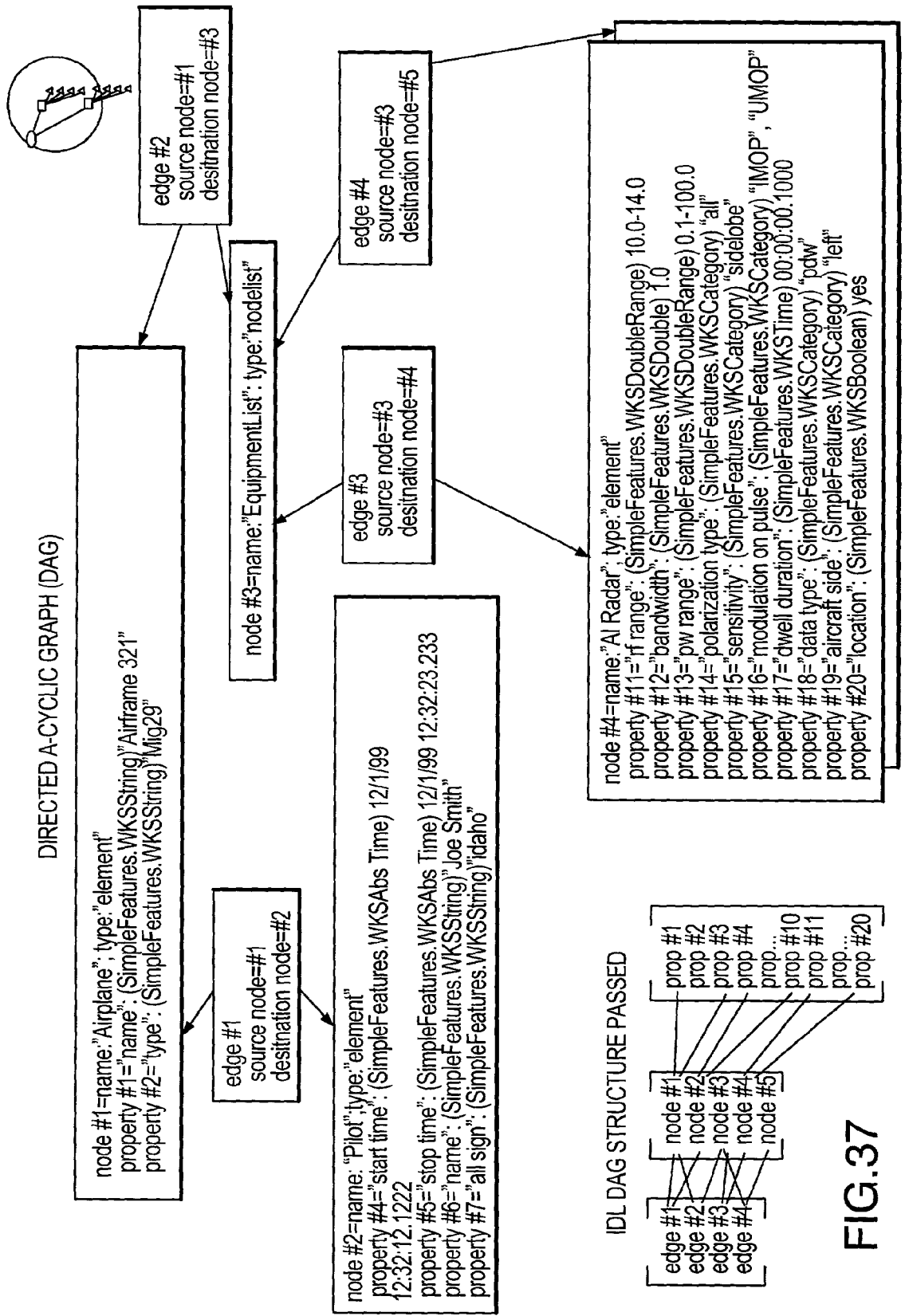

Each feature in a "feature collection" is managed in the form of a directed acyclic graph (DAG). The DAG structure is used to describe the information resulting from a query and is subsequently used to communicate (pass-by-value) the object information between the client and server. The DAG structure, which is illustrated in FIGS. 36–37 has three parts: (1) an array of properties that contain only attribute information; (2) an array of nodes that contain lists of attributes (element node) or lists of other nodes (node list); and (3) an array of edges that connect two nodes. It will be appreciated that the DAG Structure is easily converted from/to the DOM Objects.

The services tier 54 is comprised of the data channel servers 14, the library server 16, the participant server 24, the context server 26, and the document server 28, as well as other services. The services tier 54 provides services that are accessible to any other service, client tool or repository. The services tier 54 maintains the majority of the business logic as applied to a specific domain problem. The services tier 54 is designed to be extended, allowing domain specific business logic to be added and made available to the enterprise system. New services register their existence with the naming service 30 providing their home interface such that client tools and other services can learn and utilize their capabilities.

The user interface tier 56 is comprised of thin client applications/applets/servlets (the client tools 18) that allow the user to interact with the data. Each client tool 18 interfaces directly with the collection (if no collaboration is desired) or directly with the data channel(s) 14 (provides collaboration features).

Figure 11:
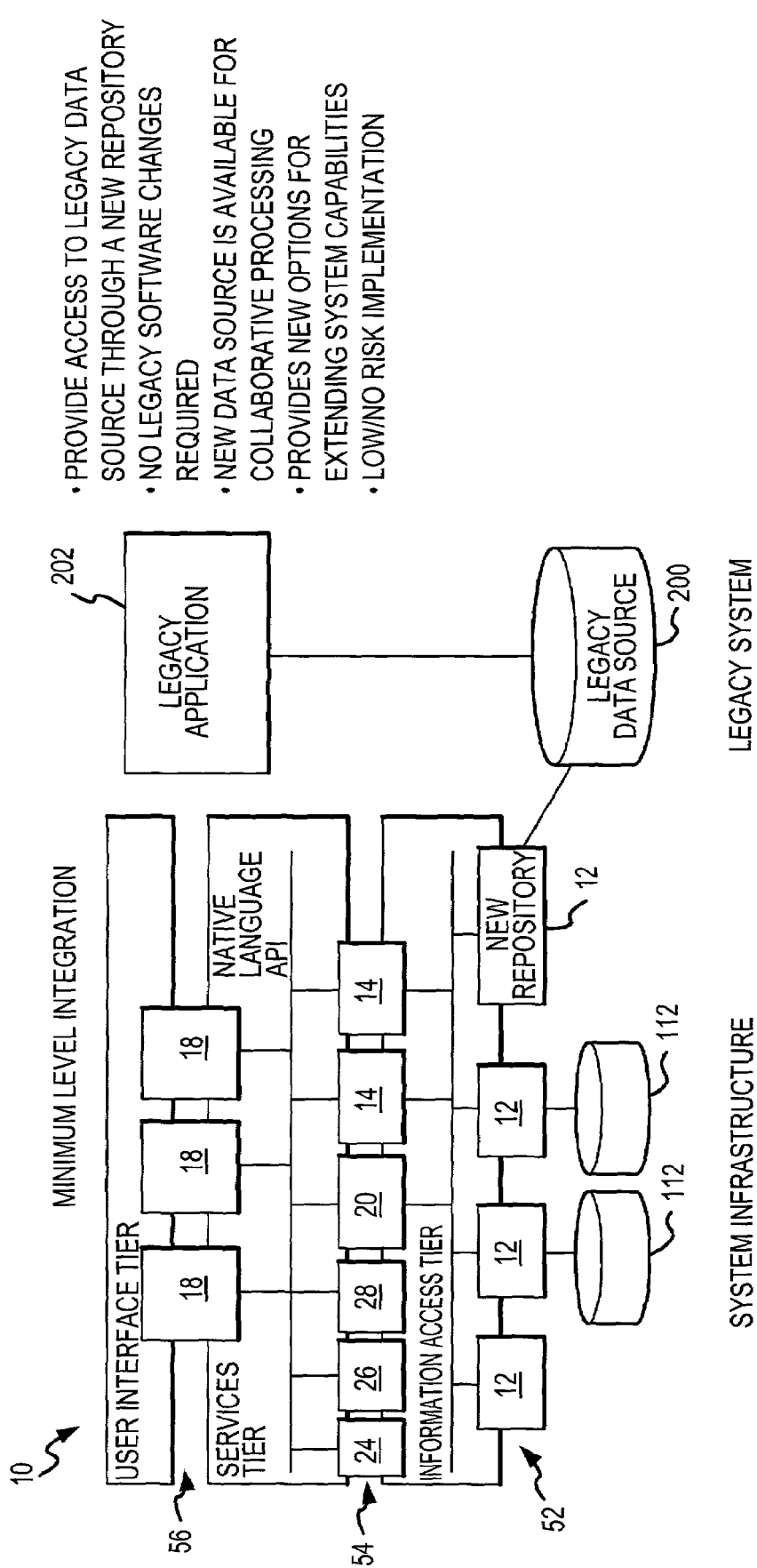
FIG. 11 is a flow chart of minimum level integration with legacy systems.
Figure 12:
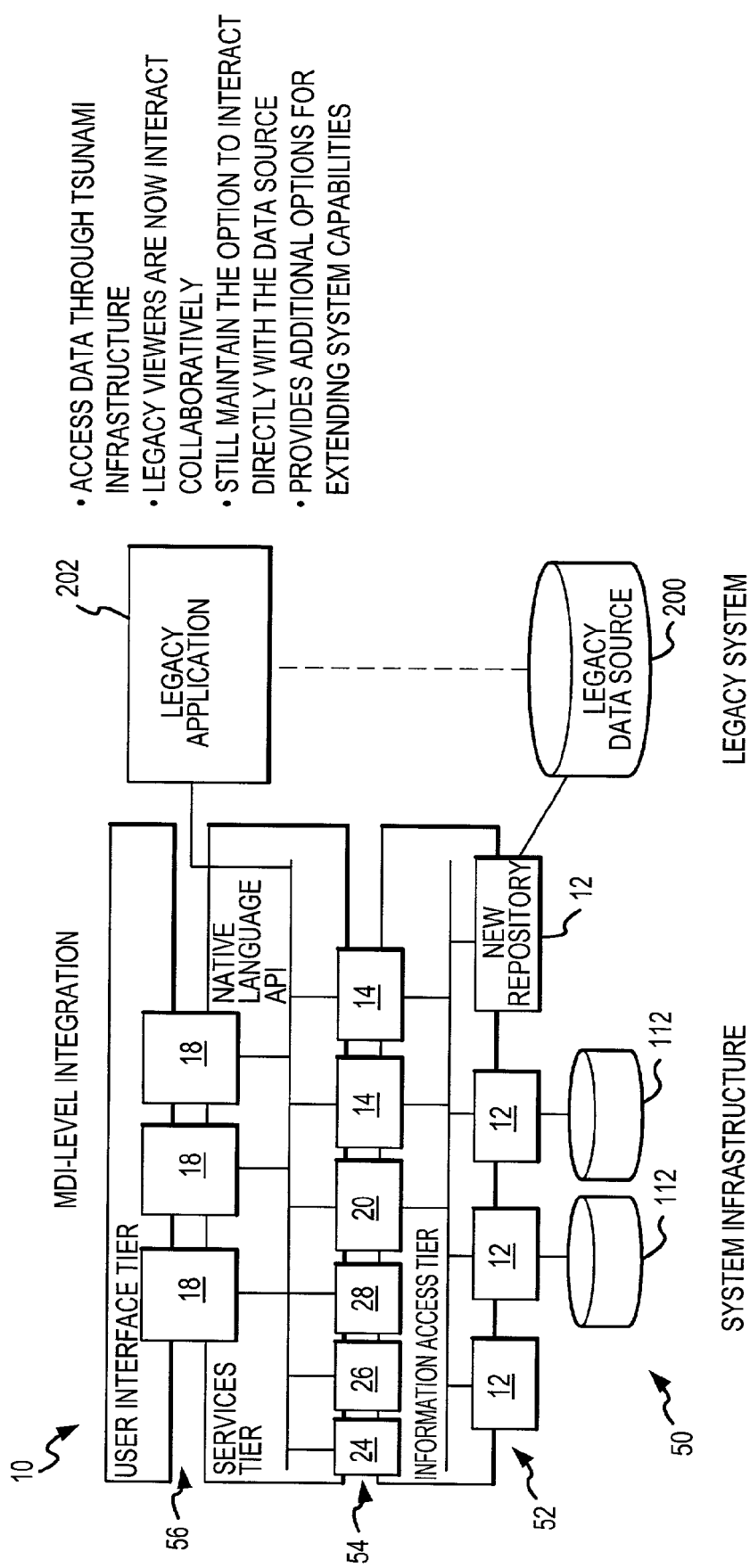
FIG. 12 is a flow chart of mid-level integration with legacy systems.
Figure 13:
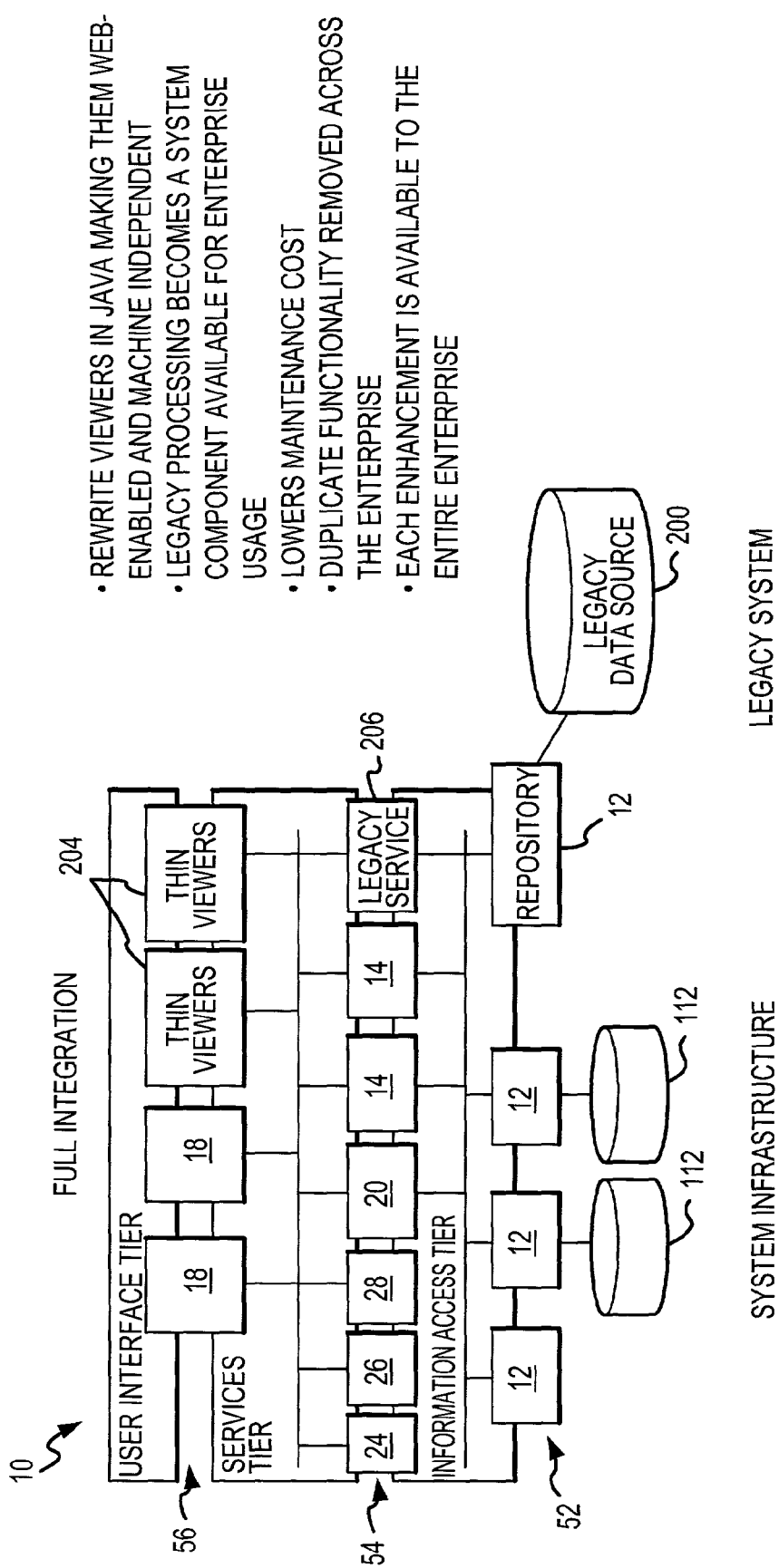
FIG. 13 is a flow chart of full integration with legacy systems.

Referring to FIGS. 11–13, the collaboration system 10 of the present invention provides an infrastructure for integrating legacy system capabilities and those provided by the collaboration system 10. The infrastructure of the collaboration system 10 provides a foundation for keeping up with rapidly changing technology and supports adaptation of new capabilities as systems evolve. The collaboration system 10 has an open architecture providing multiple options for integrating legacy systems. The level of integration selected for each legacy component depends on the capabilities of the infrastructure being utilized and the plans for system expansion. If long-term migration plans include extensive use of legacy software components, higher levels of integration are required to fully utilize the benefits of the architecture. If the plan is to make temporary use of legacy components until other capabilities are developed, a lower level of integration may be appropriate. One recommended approach provides for three levels of integration. This approach allows each component (data source, processing components, user interface) of the legacy system to be integrated as necessary to achieve the desired system capabilities.

FIG. 11 illustrates first (or minimum) level integration of the collaboration system 10 with a legacy system. First level integration requires no change to the legacy system. A repository 12 in the information access tier 52 is developed to provide access to the legacy data source 200. This level of integration allows access and manipulation of domain data by the existing tools 18 provided by the collaboration system 10 infrastructure. It allows full access to query and create documents from new and legacy data sources and allows existing viewing tools 18 (those provided with the collaboration system 10 infrastructure) to act on the data collaboratively without requiring changes to the legacy application 202 software.

FIG. 12 illustrates second (or midlevel) level integration of the collaboration system 10 with a legacy system. Second level integration involves modifying one or more of the legacy client viewers and/or processes to access the legacy data 200 through the collaboration system 10 infrastructure. In addition to having a new repository server 14 in the information access tier 52 associated with the legacy data source 200, the legacy application 202 is connected through a native languages API to the services tier 54. This enables selected portions of legacy applications 202 (combined user interfaces and processing applications) to operate in a collaborative environment and to manipulate the legacy data source 200 as well as all other data sources 112 made available to the infrastructure, while still maintaining the ability to interact directly with the legacy data source 200 using the legacy application 202.

FIG. 13 illustrates third (or full) level integration of the collaboration system 10 with a legacy system. Third level integration involves rewriting components (data viewers, processing) of the legacy system using the underlying component architecture of the collaboration system 10. This provides the benefits of component distribution, system management, viewers that are Web enabled, and supports lifecycle management (activation, passivation, and persistence). As with first and second level integration, a new repository 14 is provided in the information access tier 52 that is associated with the legacy data source 200. However, in the case of full integration, the legacy application is rewritten as one or more thin viewers 204 included in the user interface tier 56 and a legacy processing service 206 included in the services tier 54. The thin viewers 204 may, for example, be rewritten in Java making them Web enabled and machine independent. Incorporating the legacy user interface and processing services into the user interface tier 56 and services tier 54, respectively, makes them a system component available for enterprise usage. It will be appreciated that, full integration of the collaboration system 10 with a legacy system lowers system maintenance costs, eliminates duplicate functionality across the enterprise, and makes each enhancement available to the entire enterprise. In addition, the integration technique chosen, and corresponding benefits, are managed stepwise with respect to both cost and risk, in accordance with project needs using the present invention.

Referring to FIG. 14, the collaboration system 10 of the present invention moves the complexity of collaborative processing into the infrastructure. Visualization and control properties (color, selection, symbology, etc.) become an extended part of the data within the infrastructure rather than simply being a hard-coded characteristic of the client viewing tool 18. In this approach, client applications (user interfaces, processing agents) are simplified by removing the need for specialized data access methods or collaboration implementation logic. Viewing tools 18 simply access the data through the infrastructure, display or manipulate the data as appropriate to the tool 18, and provide any updates back to the infrastructure. Any interactions with the data, including manipulating visualization characteristics, are viewed collaboratively by all tools 18 interacting within the same conference 102. Because all of the visualization and control properties are treated as an extension of the domain data, the infrastructure provides a natural environment for software agent technology to be applied as "collaborative agents" working to solve a problem. Agents can monitor and act on actions performed by human participants or can be configured to perform actions based on control information.

Figure 15:
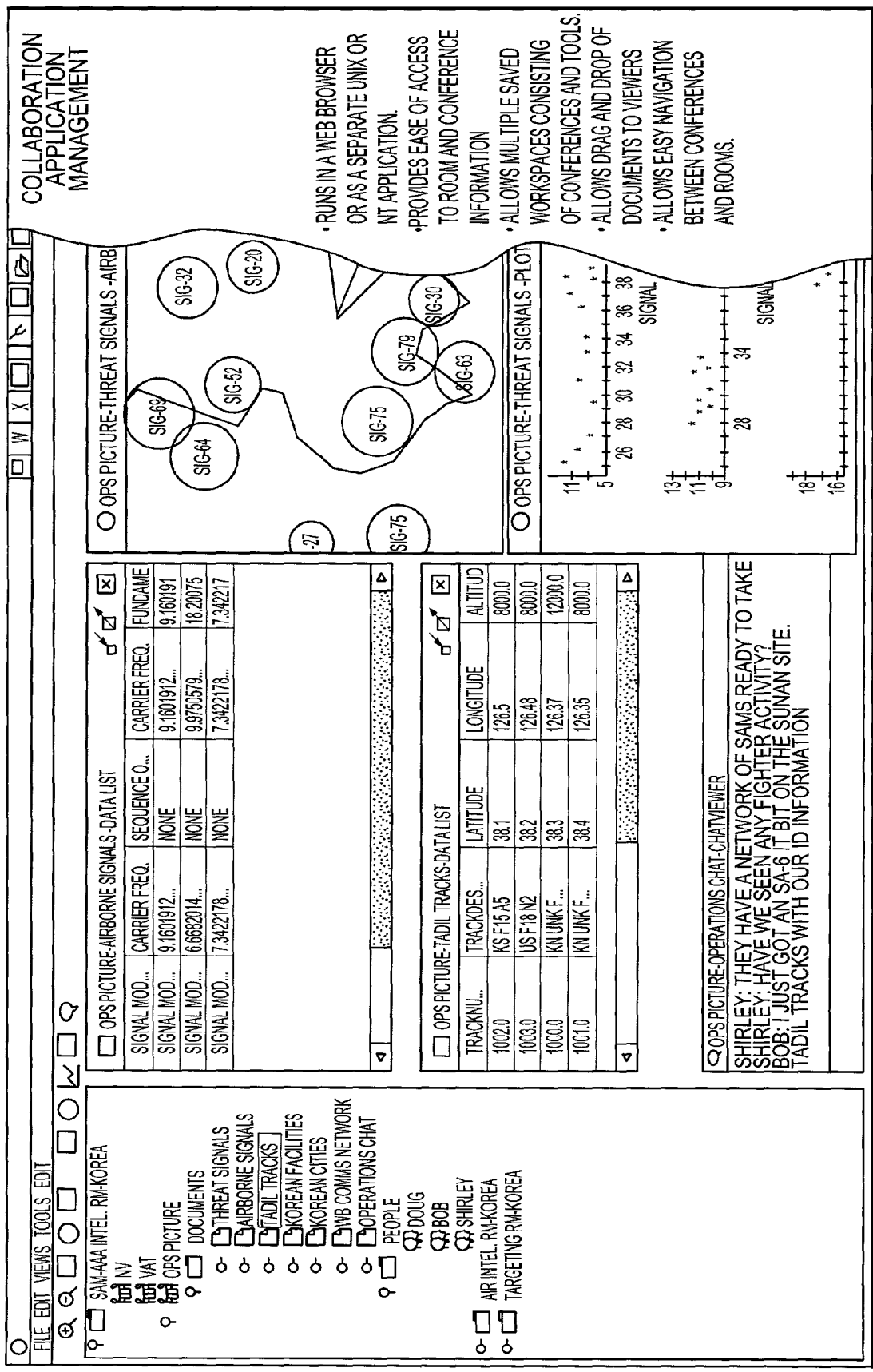
FIG. 15 is a first chart illustrating collaboration application management.
Figure 16:
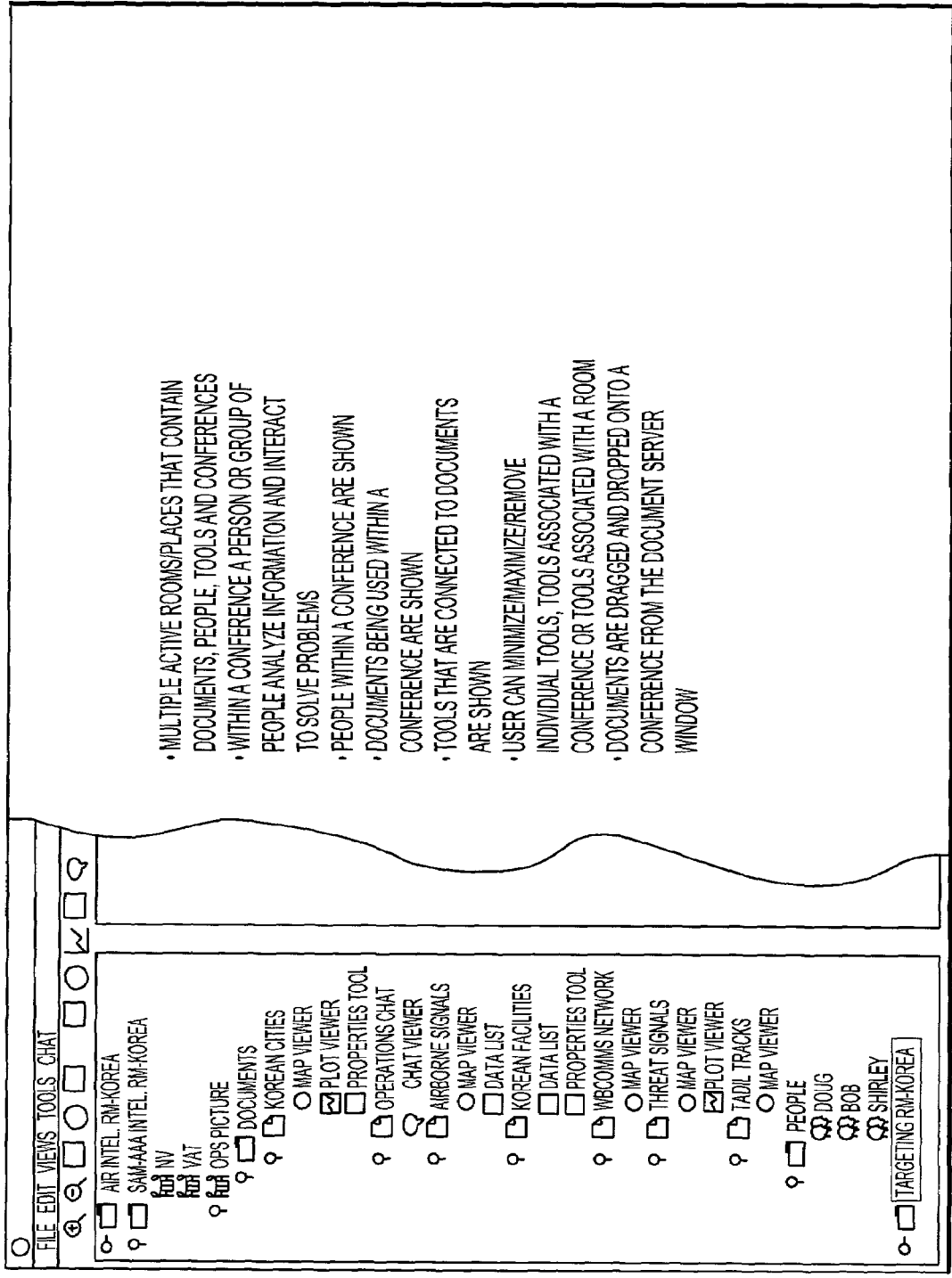
FIG. 16 is a second chart illustrating collaboration application management.

Referring now to FIGS. 15–22, exemplary user interfaces of the collaboration system 10 and several components thereof are shown. FIGS. 15–16 show an exemplary embodiment of a user interface 60 of the collaboration system 10. The collaboration system user interface 60 may be configured to run within another application, such as a Web browser, or as a separate application within the operating system environment of the user terminal 106. The collaboration system user interface 60 provides for ease of access to the conferences 102 and information within a conference 102. In this regard, the various conference rooms 102 within a context 100 may be displayed in a left hand side panel of the collaboration system user interface 60. Windows associated with the various client tools 18 are displayed within a right hand side panel of the collaboration system user interface 60. The collaboration system user interface 60 allows multiple saved workspaces consisting of conferences 102 and tools 18. It also allows for the dragging and dropping of documents 110 into the various viewing tools 18. Additionally, the collaboration system user interface 60 permits easy navigation between conferences 102. There may be multiple active conferences 102 containing documents 110, participants 104, tools 18. Within a conference 102, a participant or group of participants 104 analyze information and interact to solve problems.

Figure 17:
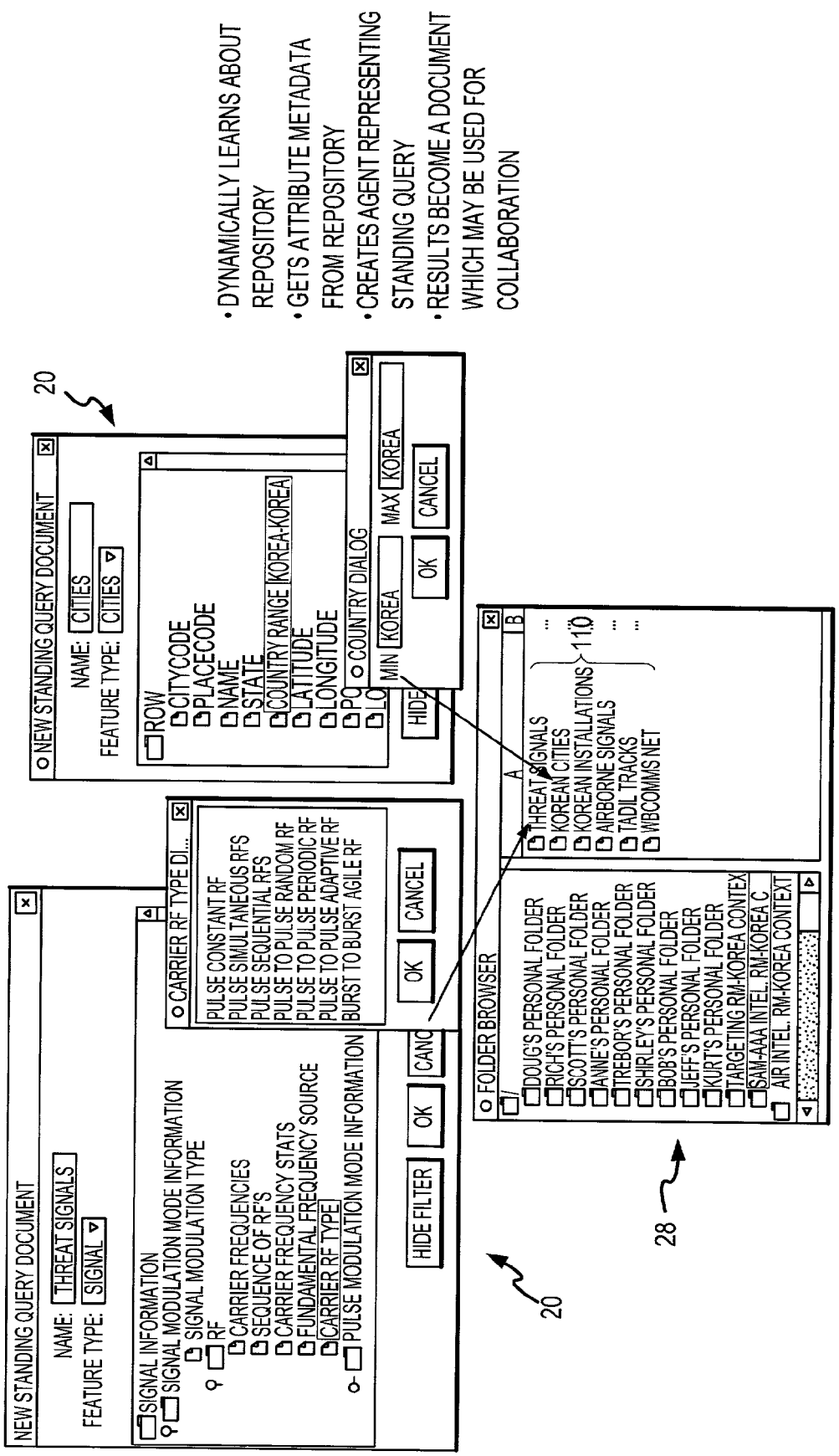
FIG. 17 is a flow chart of the repository query and document management.

FIG. 17 illustrates interfaces of the query viewing tool 20 and view into JCS document server 28. The query viewing tool 18 dynamically learns about the repositories 12 and gets attribute metadata from the repositories 12. It creates an agent representing the standing query. The results of the query become a document 110 which may then be used for collaboration. The document itself is a token representing the results—no document data is conveyed to the user's viewer by this action. The documents 110 created by the standing query agents are displayed within the JCS document server 28 interface.

Figure 18:
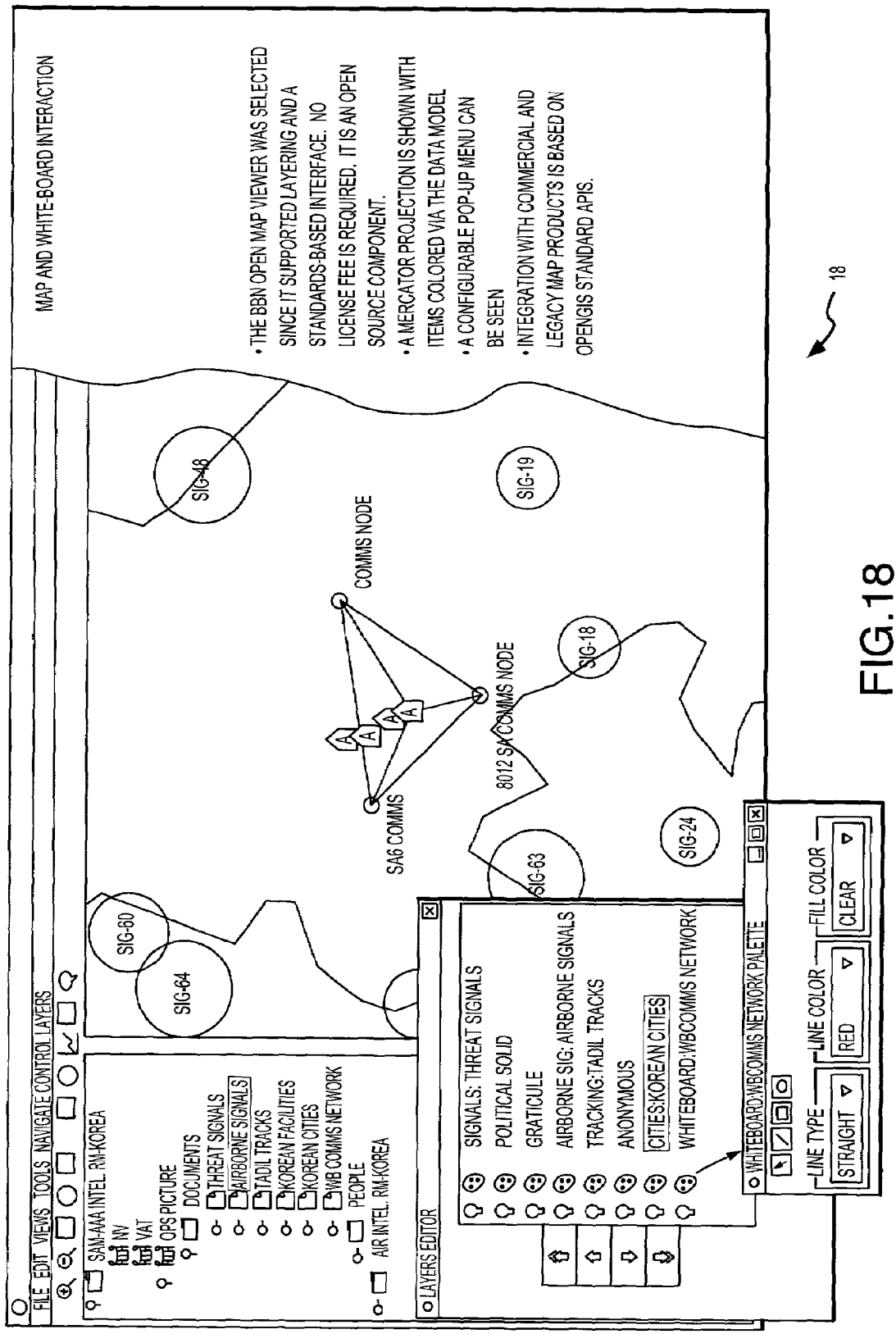
FIG. 18 is a map and white-board interaction.

FIG. 18 shows an interface of the map viewing tool 18. The map viewing tool 18 may comprise an open source component such as, for example, the BBNOpen Map Viewer, which supports layering and a standards-based interface. The map viewing tool 18 displays a map in a chosen projections (e.g., a Mercator projection as is shown) with the data items overlaid on the map and colored in accordance with their extended properties in the data model. The map viewing tool 18 includes a configurable pop-up "layers editor" menu where the user may edit visualization attributes (e.g., line type, line color, fill color) for display of the data items.

Figure 19:
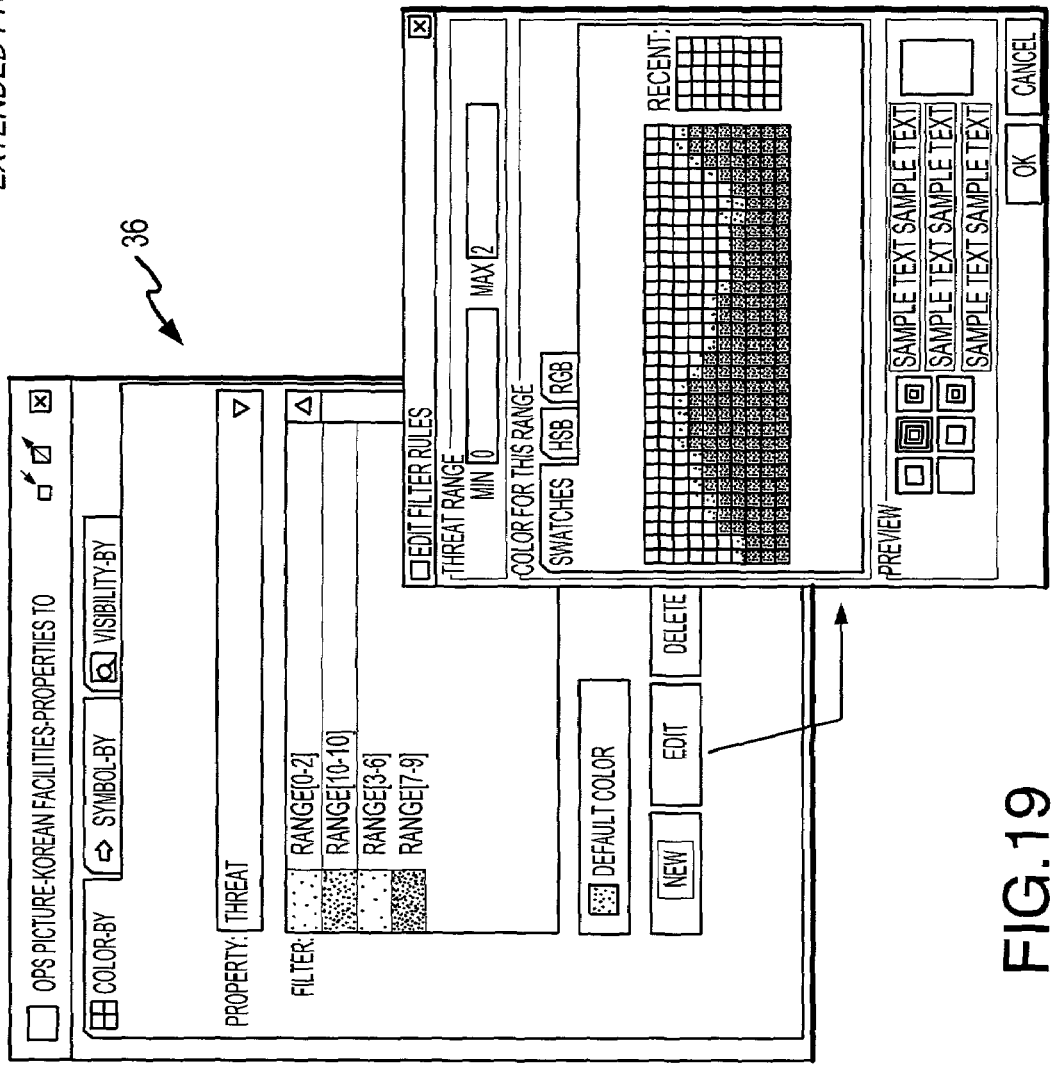
FIG. 19 illustrates the function of the extended properties editor.

FIG. 19 shows an interface of an extended properties editor 36. The extended properties editor 36 provides for attachment of extended properties (e.g., color, highlight, visibility, label, symbol, etc.) to data items in the data channel(s) 14. The extended properties editor 36 dynamically learns the information schema from the repositories 12. The rules applied through the extended properties editor 36 run as agents within the data channel(s) 14.

Figure 20:
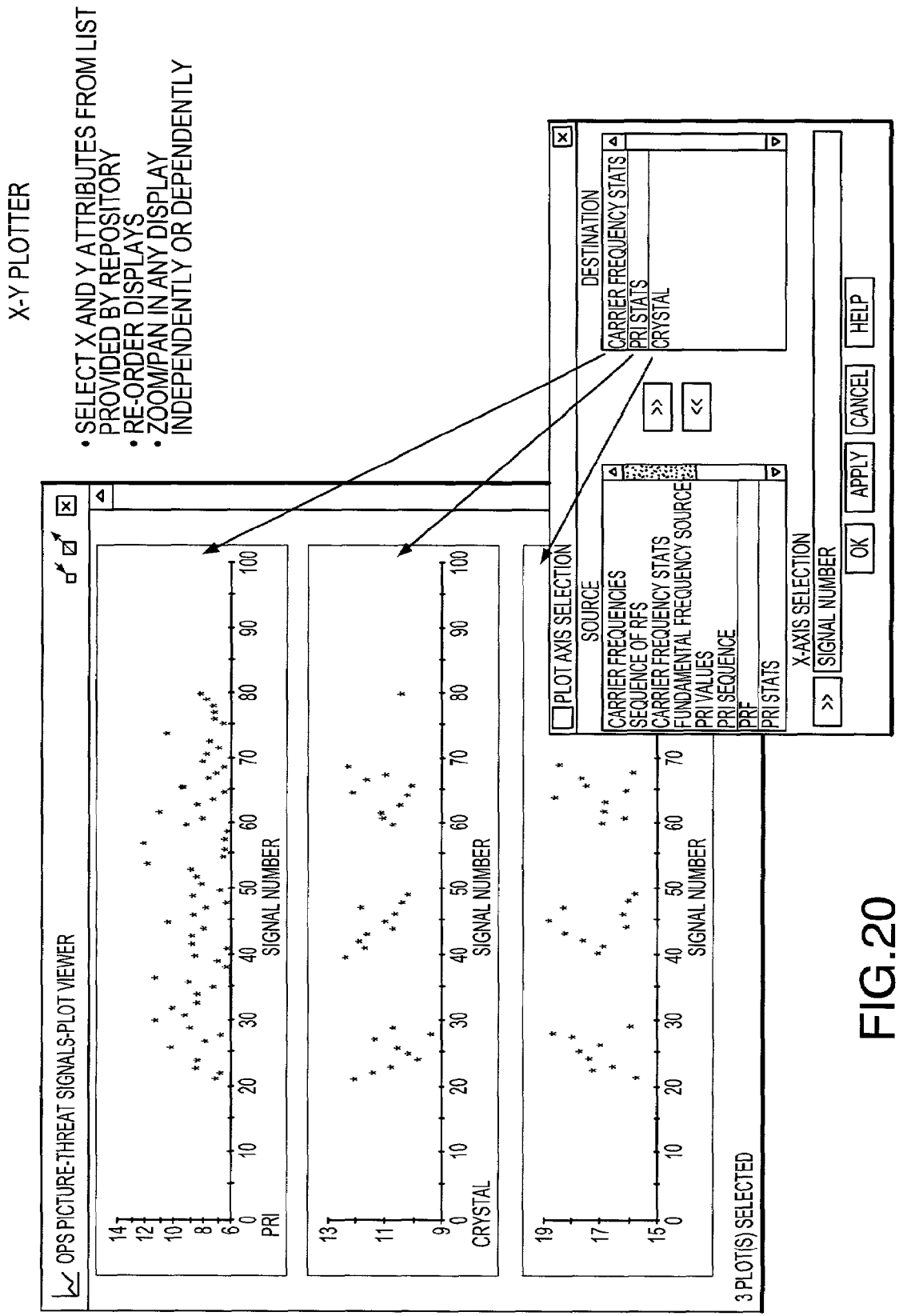
FIG. 20 illustrates the output from an X-Y plotter.

FIG. 20 shows an interface of the X-Y data viewing tool 18. The X-Y data viewing tool 18 allows the users to select X and Y attributes from the list provided by the repositories 12 for display within one or more plots, provides for reordering of the plots, and permits zooming and panning in any plot independently or independently.

FIG. 21 shows an interface of the list viewer tool 18. The interface of the list viewer tool 18 provides for viewing and manipulation of data items from the data sources 112 in a table format. In this regard, the data items may be sorted. Specific rows within the data table may be selected, colored, and hidden. Additionally, the participants 104 may select various attributes of the data items for viewing.

FIG. 22 shows an interface of the chat tool 18. The chat tool 18 supports multi-user conversations from multiple conferences 102 in multiple contexts 100. As a shown by the example text within the chat tool 18 interface, participants 104 connect to a document 110 and communicate with one another. Participants 104 in the same conference 102 see the same visualization properties such as color and visibility of participant inputs.

Figure 23:
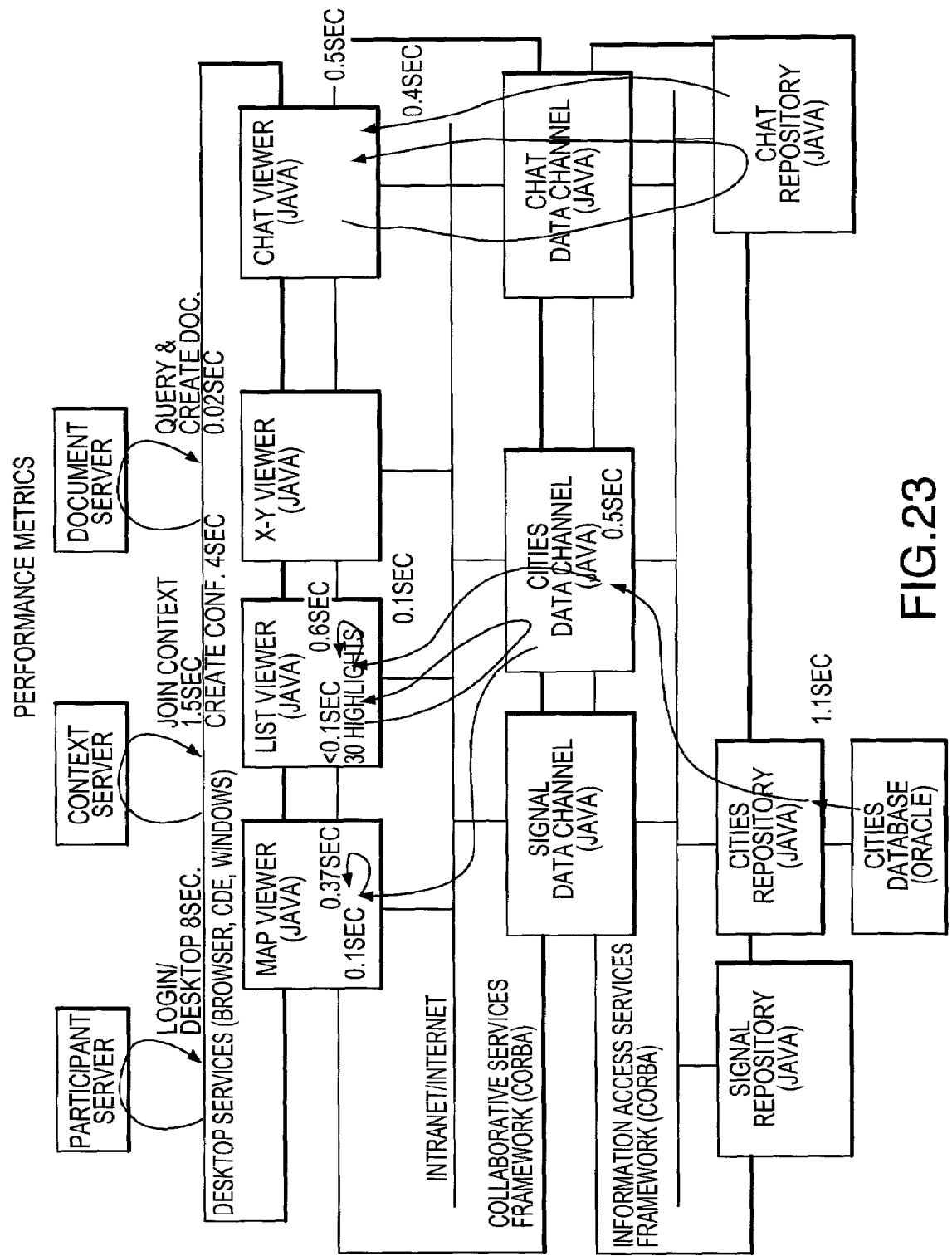
FIG. 23 is a flow chart illustrating the performance metrics.

It will be appreciated that the previously described collaboration system 10 infrastructure provides a change to the way systems are built and enhanced. Using the collaboration system 10 infrastructure, new capabilities can be added to the system as small client applications that interact through the infrastructure. The resulting system is constructed of many small applications providing unique capabilities that work together to form the entire system. Each client user interface, processing component, or data repository interacts in a data centric collaborative environment where each component capability extends the capabilities of the other components. The result is a system whose overall capability grows exponentially with every added capability. With the collaboration system 10 infrastructure, each user is free to select the appropriate tools 18 to be most effective at analyzing and manipulating data no matter what the data source 112. This allows human resources with varying backgrounds (engineering, analytical, mathematical, operational, etc.) to use specialized tools that enable the most effective application of their diverse skills to solve problems. In this regard, the performance metrics of one embodiment of a computer implemented collaboration system 10 in accordance with the present invention are summarized in FIG. 23.

Figure 24:
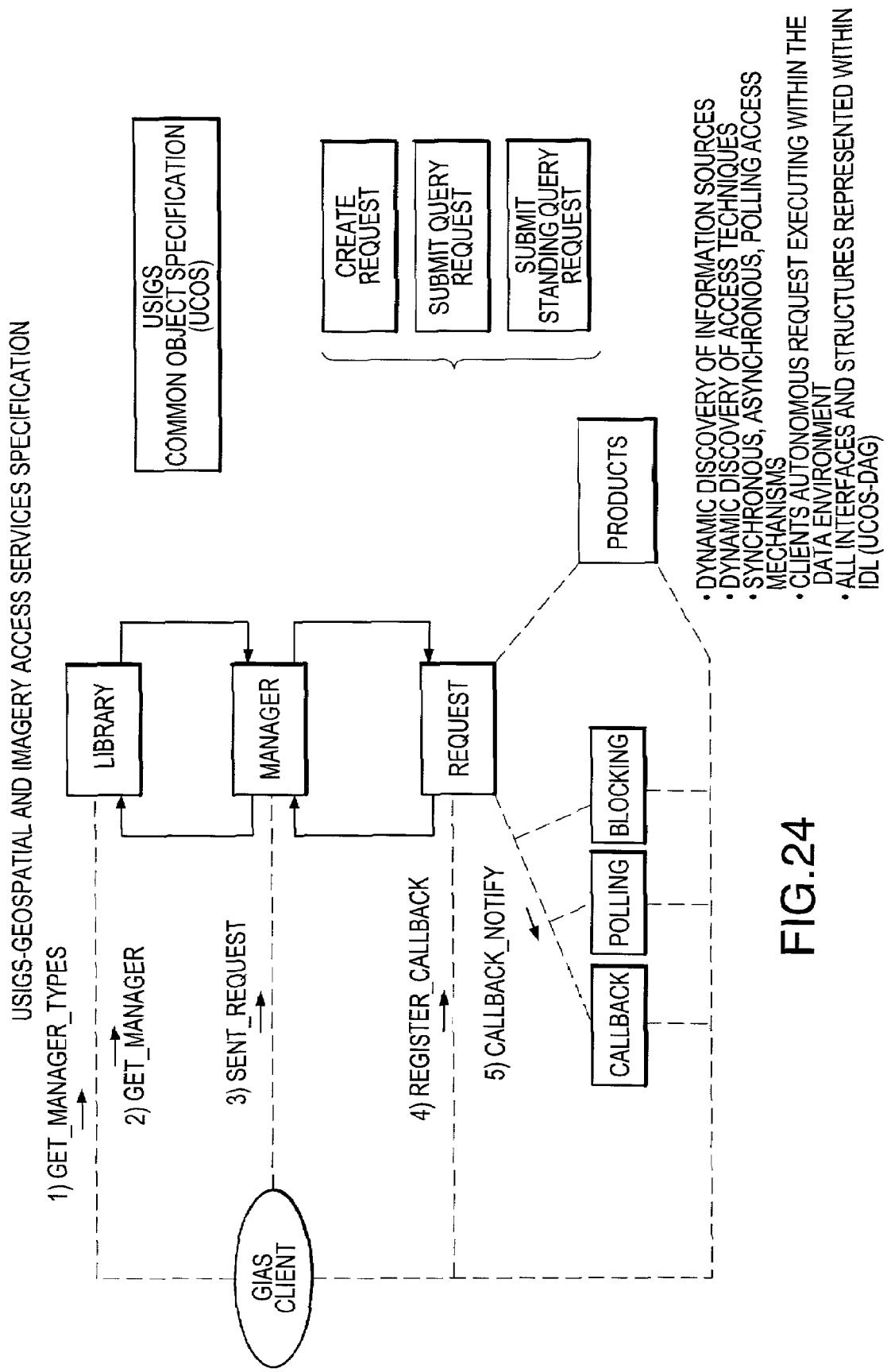
FIG. 24 illustrates the high level interaction between various information access service (IAS) components in accordance with the USGIS.
Figure 25:
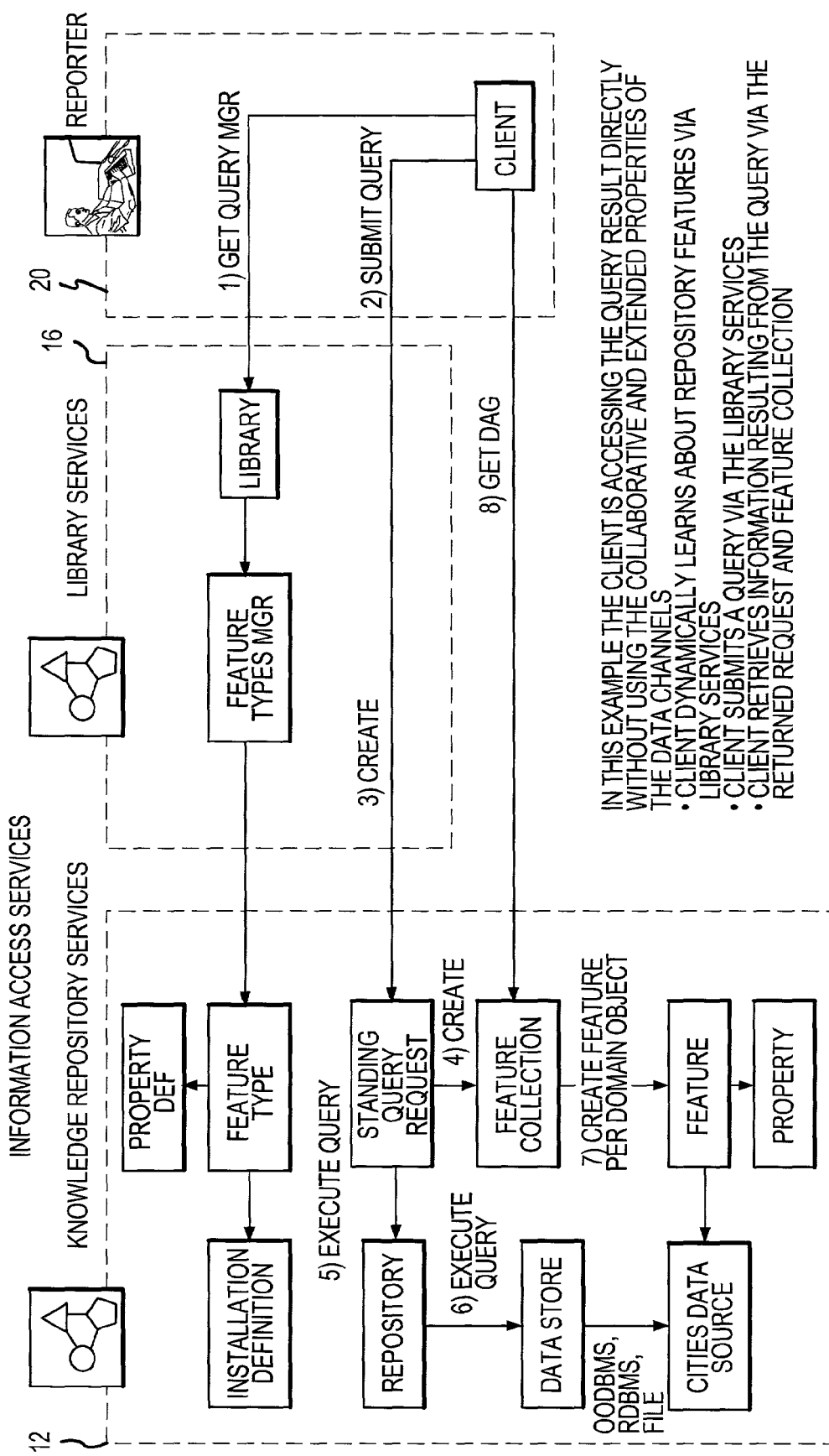
FIGS. 25–27 illustrate the lower level interaction between IAS components.
Figure 26:
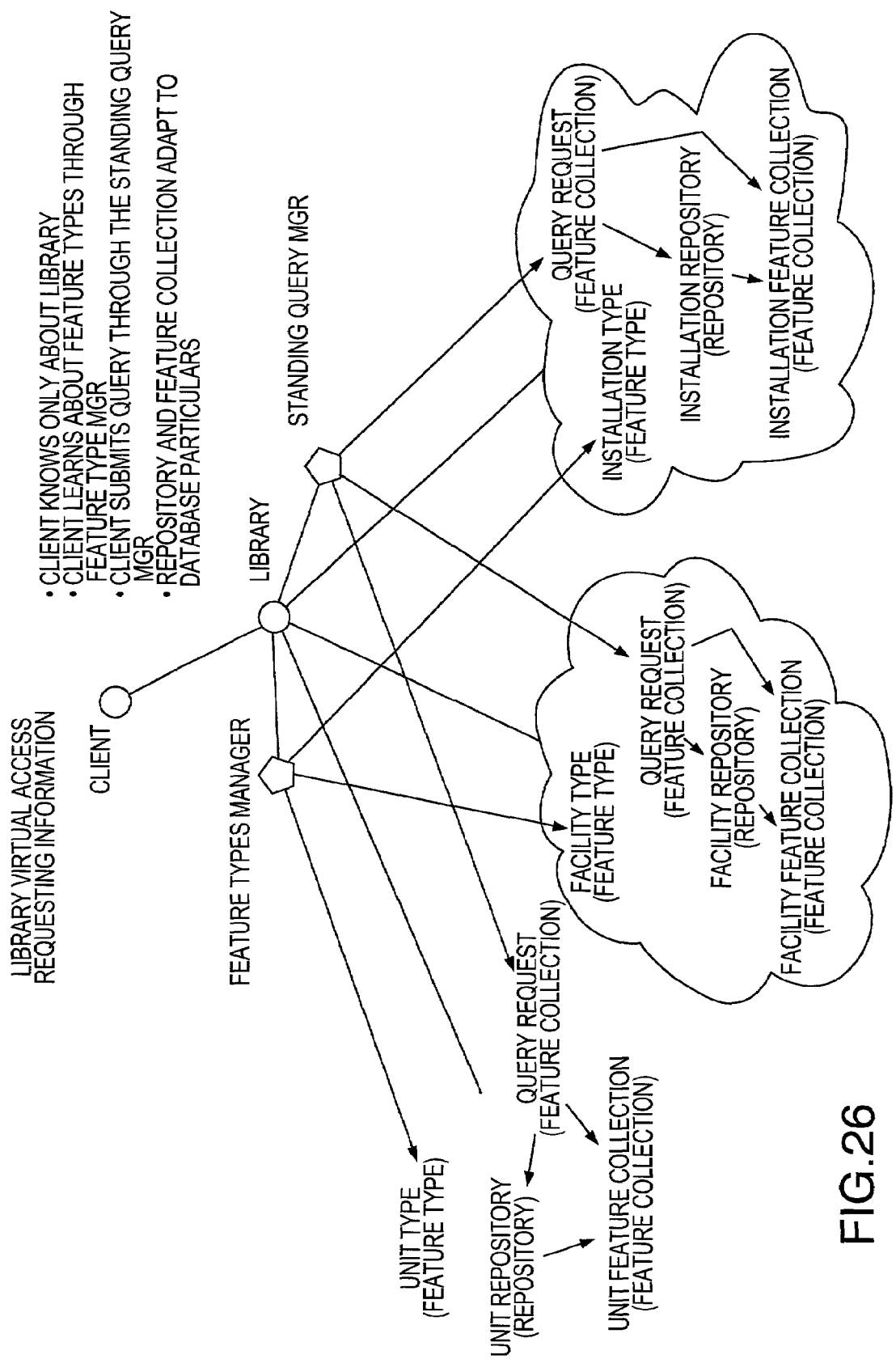
Figure 27:
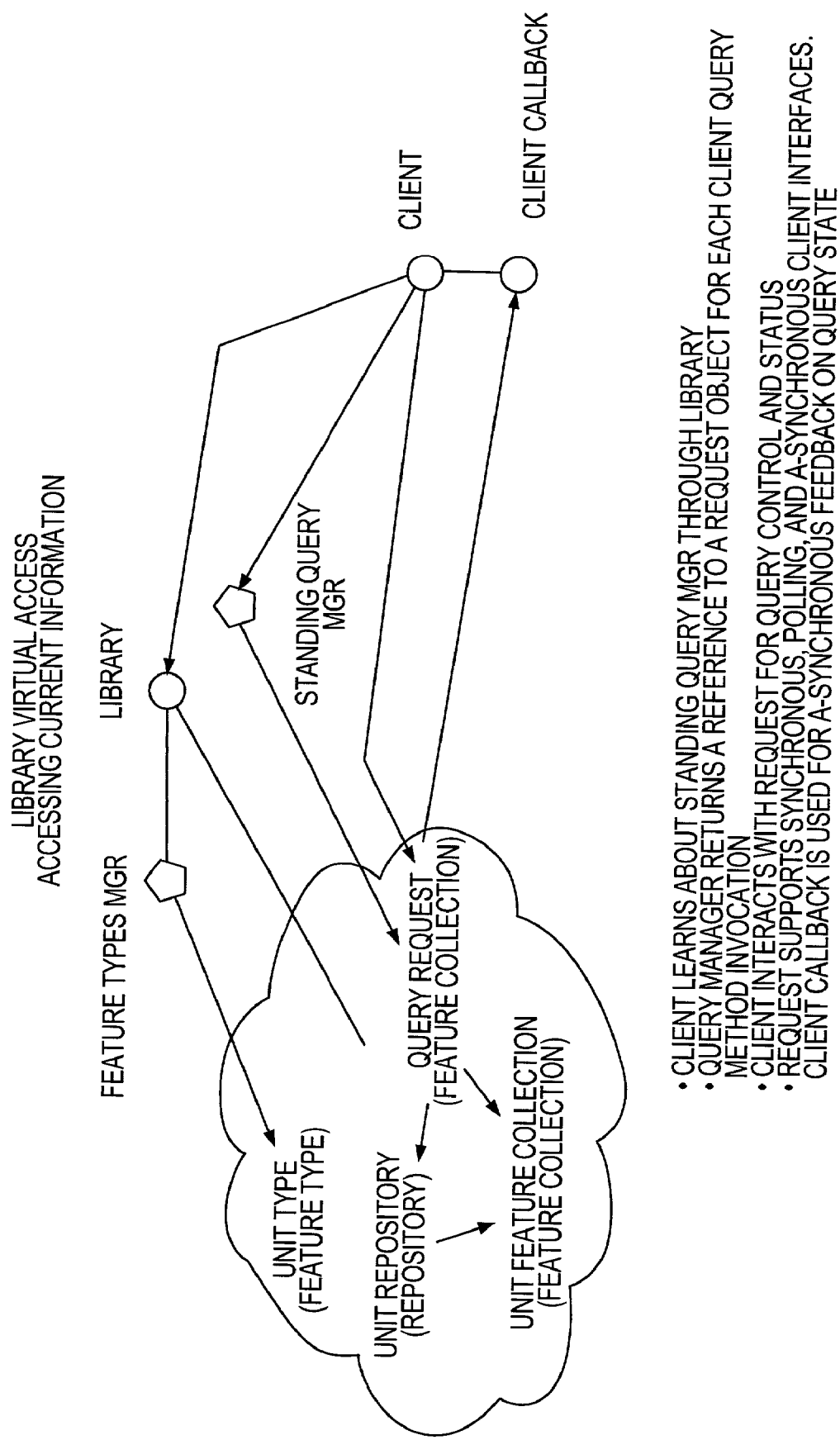
Figure 28:
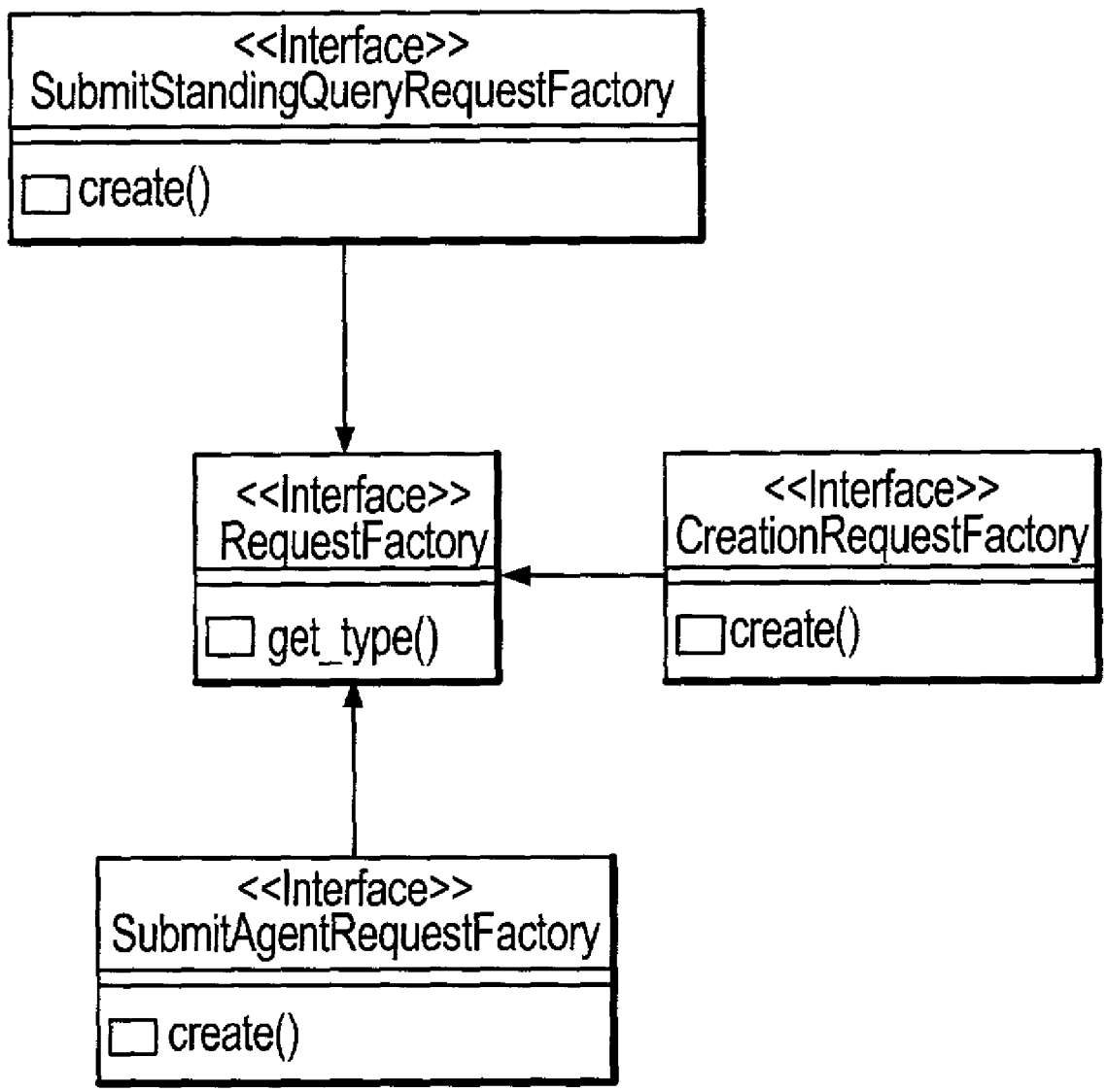
FIGS. 28–32 illustrate the inheritance structure of the various IAS components illustrated in FIGS. 24–27 is illustrated in FIGS. 28–32.
Figure 29:
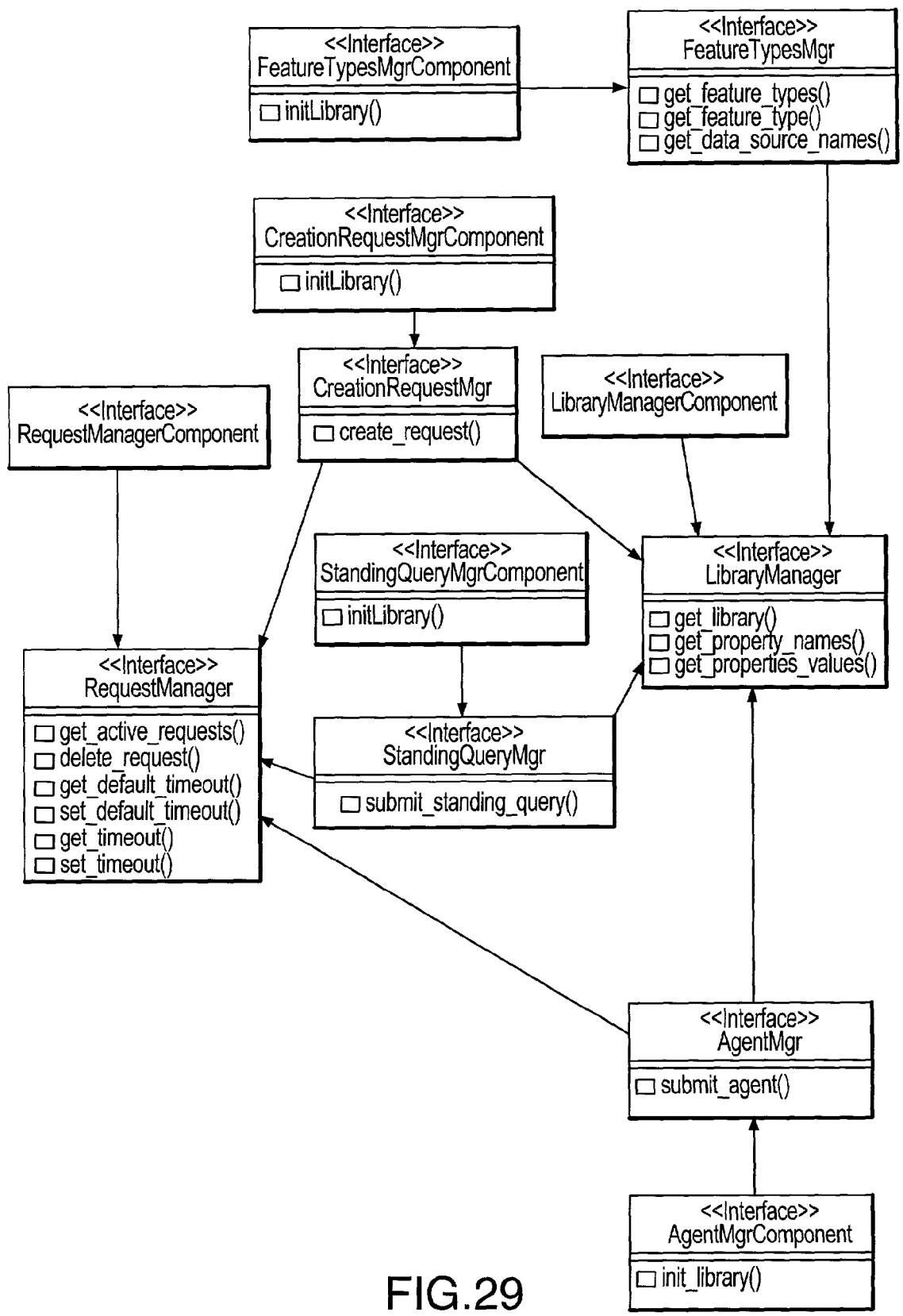
Figure 30:
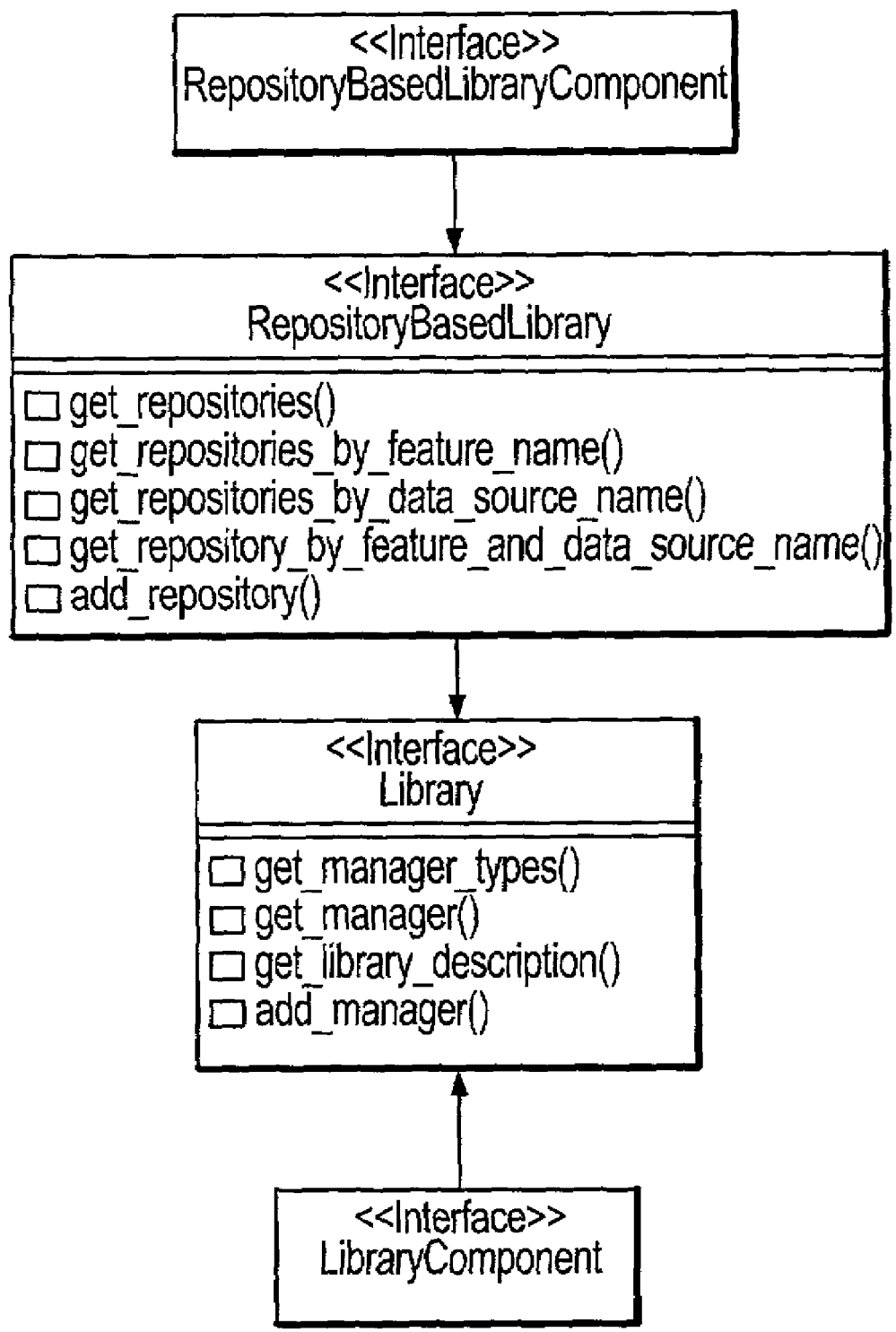
Figure 31:
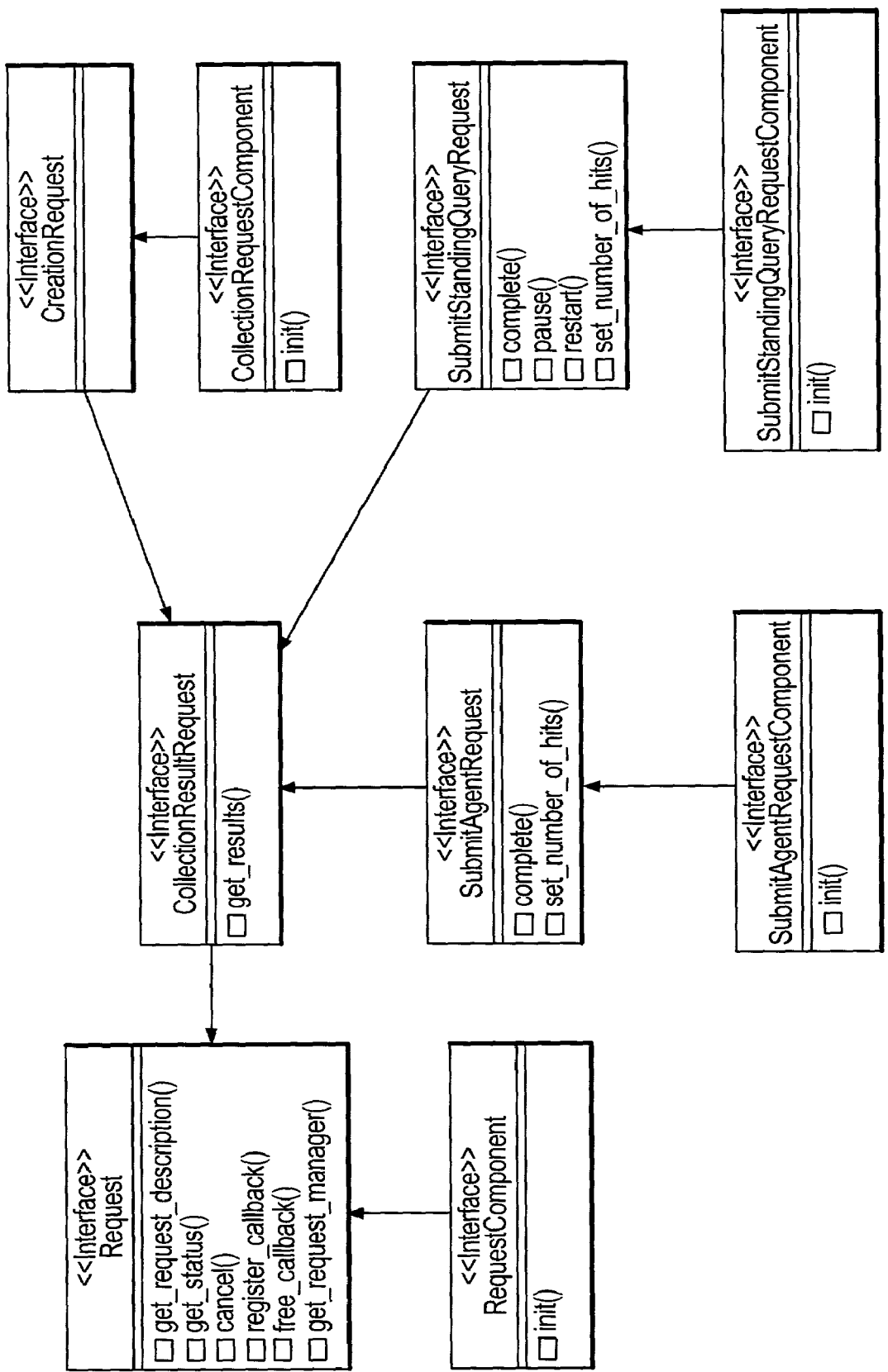
Figure 32:
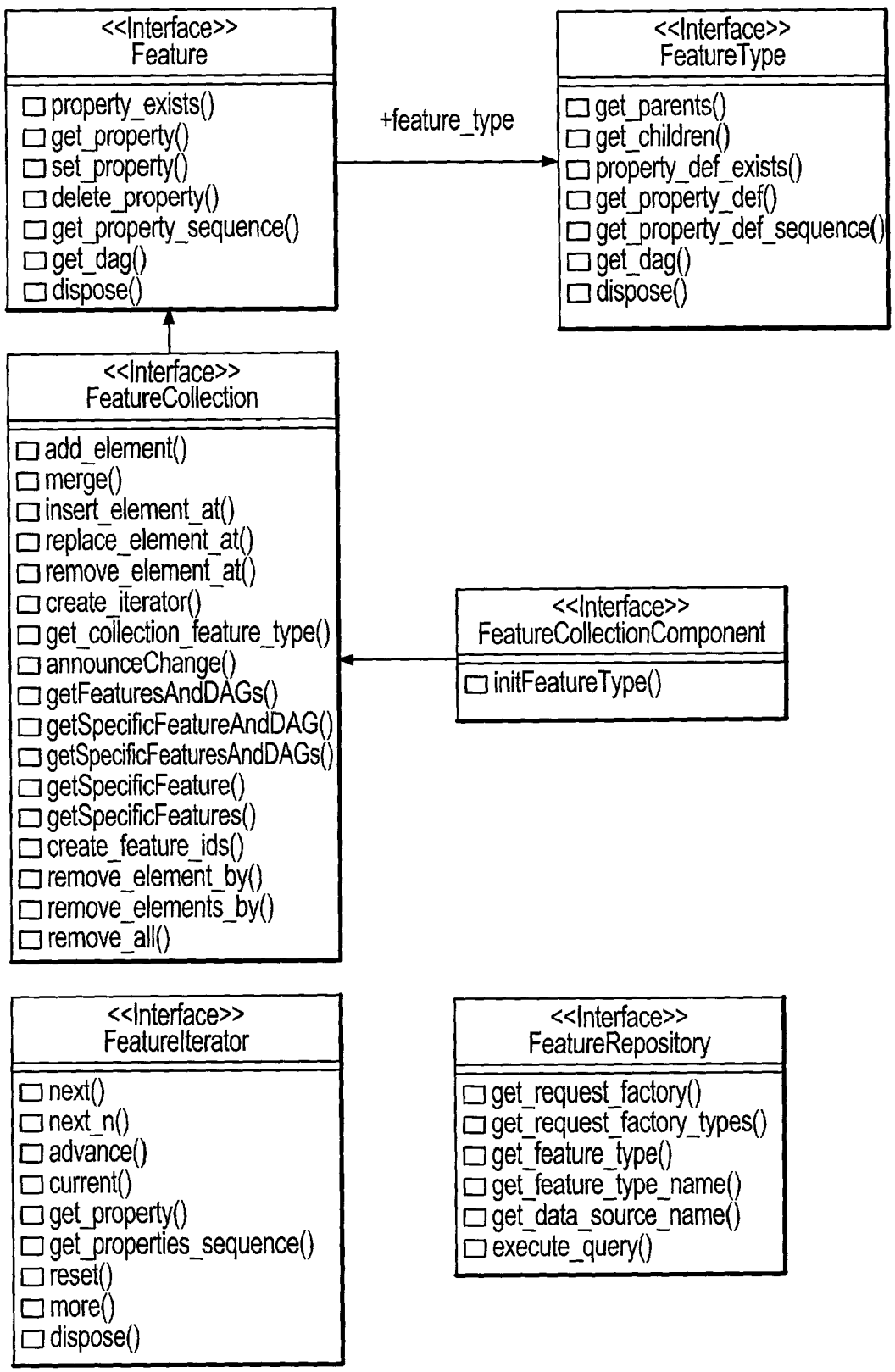

Referring now to FIGS. 24–27, the collaboration system 10 of the present invention provides information access services (also referred to as library services). The information access services (IAS) are composed of a set of factory components, management components, library components, and request components that provide methods for discovery of available data sources 112 and the creation of requests for information from those data sources 112. These components are based on the United States Imagery and Geospatial Services (USIGS) Geospatial and Imagery Access Services (GIAS) Specification. FIG. 24 illustrates the high level interaction between libraries, managers and requests. FIGS. 25–27 illustrate the lower level interaction between the (IAS) components in performing a query on a data source 112 and subsequently retrieving data to be used by a client tool 18.

Features of the various interface components in FIGS. 24–27 are summarized in the table below.

| | |
|---|---|
| Library: | "Named" Object within the production domain that supports information access capabilities. All IAS services accessible through the Library Object. Database location, data representation (schema, object model), and type (RDBMS, OODBMS, file) are transparent to users of IAS. |
| Standing Query Manager: | Is responsible for initiating the client request and then managing the request objects over the duration of the transactions. Other types of Managers (Query Manager, Agent Manager, etc.) support different forms of information access. |
| Standing Query Request: | Client query transactions result in the creation of a Request Object. The Request provides the client visibility into the information access process. The client has three methods of being notified when information is available: Post a callback for a-synchronous notification; Synchronously block until information is available; or Poll for Request status periodically. |
| Feature: | Provides a common adapter (interface) to a domain object. Through the Feature, a client can access a domain object's information. The Feature and Repository Objects provide an adapter layer that shield client programs from the difference database storage and access mechanisms. |
| Property: | A Directed Acyclic Graph (DAG) of Properties is used to retrieve/update the information on a particular Domain Object. Associations between two Features (Facility -> Equipment) is represented as a DAG property that contains a sequence of feature association structures. From this property (within Facility) a client can create a second collection of Features (Equipment) that can be displayed. |
| Feature Type: | The SIGINT Object Model (SOM) and Fusion Object Model (FOM) have identified a set of core classes (Features - Installation, Facility, Equipment, Unit, Signal, etc) that make up a domain. Through the Feature Type a client can obtain retrieve meta-data that is used to construct a query. |
| Property Def: | A Directed Acyclic Graph of Property Def's (DAG Def.) is used to pass the definition of a particular Domain Object. |
| Repository: | Provides a common interface to a storage server for query evaluation and management. Each Feature Type within a database will have an associated Repository Object. The Query Request created by the Query Manager goes to the Repository for evaluation. The Repository is responsible for converting the query, which is in the domain terms, into the specific language and schema of the database. The Repository performs the query and populates the Feature Collection with feature objects. |
| Factory: | Provides services for construction of instance objects. There is a specific factory for each class. Multiple construction methods may be provided depending on the factory. |

The inheritance structure of the various IAS components is illustrated in FIGS. 28–32.

Referring more particularly to FIG. 25 when a user of the collaboration system 10 activates the query viewer client tool 20, the query viewer client tool 20 dynamically learns about repository features via the library server 16. In this regard, the query viewer client tool 20 gets the query manager from the library server 16, which includes a library and a feature types manager. The feature types manager in turn accesses a feature type within the repository server 12. The feature type includes a property definition and an installation definition. Using the query viewer client tool 20, a query is submitted via the library server 16 to the repository server 12. In this regard, when the repository server 12 receives a query request created through the library server 16, the repository server 12 creates a standing query request. The repository server 12 then creates a document 110 (also referred to herein as a feature collection) and also executes the query. The standing query request is executed through a repository and a data store to access data within a data source 112 associated with the repository server 12. The repository server 12 creates a feature for each domain data item meeting the specified query criteria. Each feature created includes an extended property. The document 110 created in response to the query is returned in the form of a directed a-cyclic graph (DAG) to the query viewer client tool 20.

Figure 33:
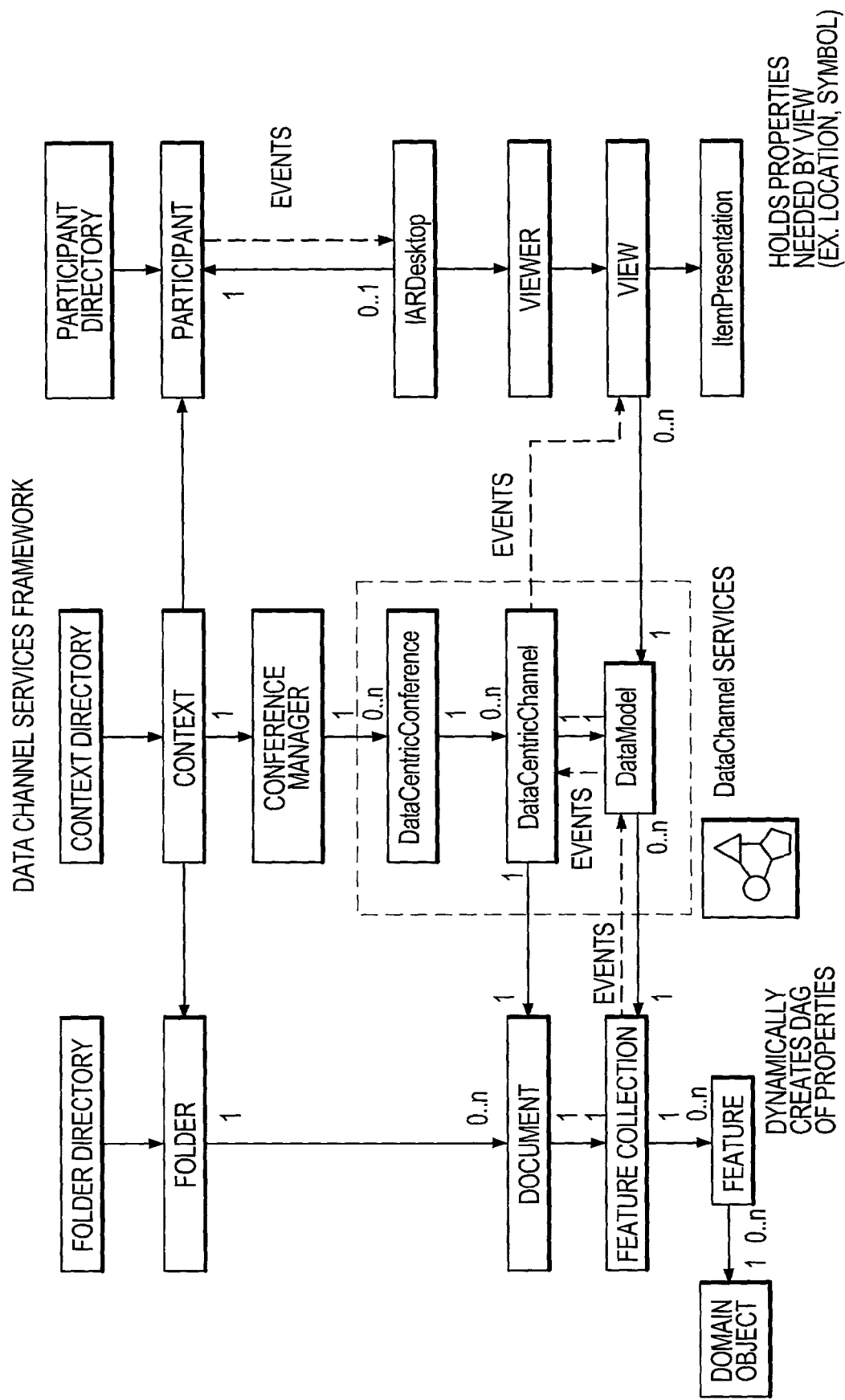
FIG. 33 illustrates the data channel services framework.
Figure 34:
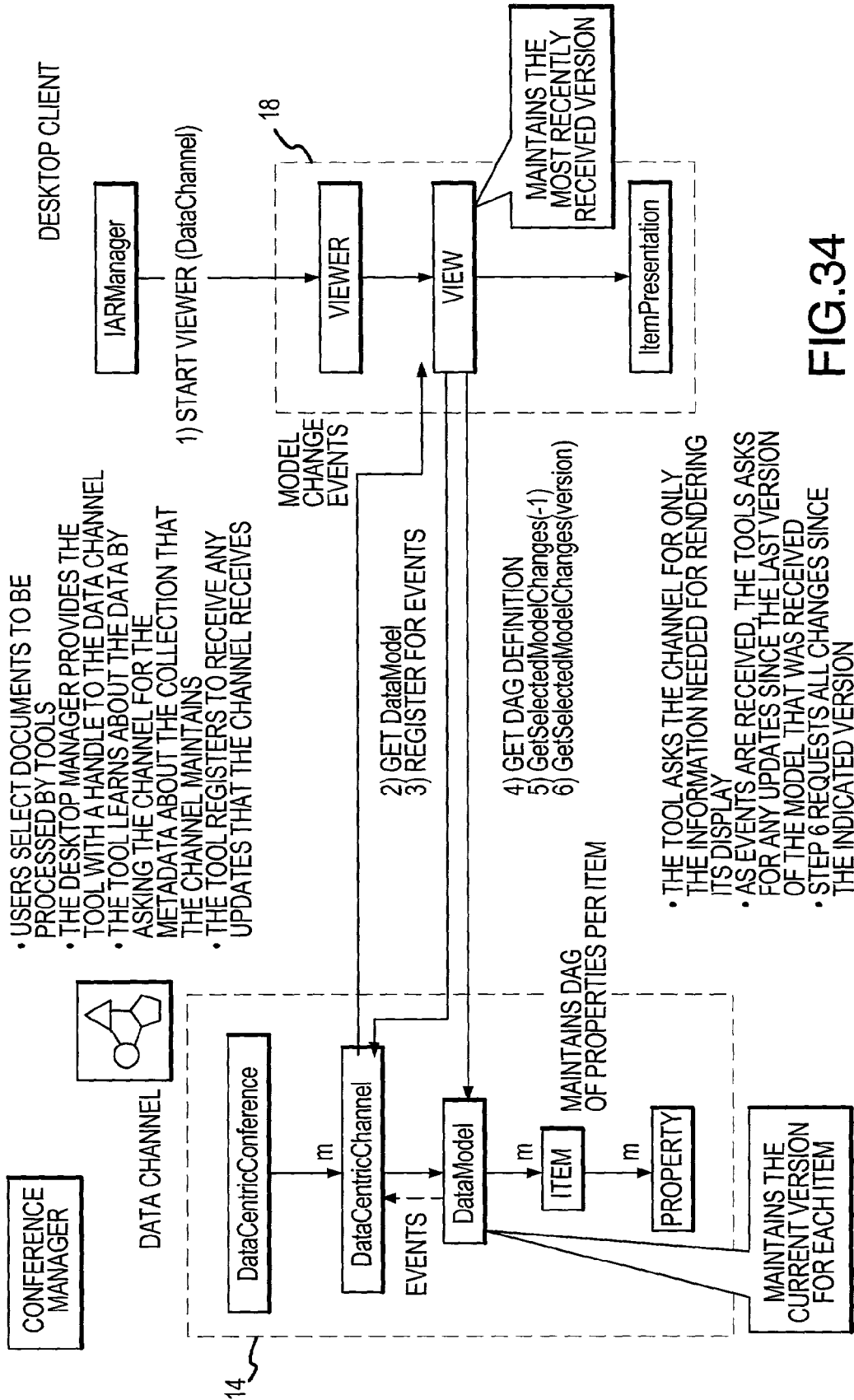
FIG. 34 illustrates the versioning of data changes in the data channel.

Referring now to FIGS. 33–34, the data channel is the collaborative interface to the data provided by a document 110. A data channel server 14 is created when a document 110 is placed into a conference 102. Upon initialization, the data channel server 14 is extended to provide visualization and control properties such as highlight, visibility, and color. The data channel server 14 is extendable from client applications or agents in real time by calling methods on the extended properties manager to teach the data model additional collaborative attributes. FIG. 33 shows the data channel services framework in relation to other component interfaces within the collaboration system 10 architecture.

FIG. 34 illustrates the components that make up a data channel server 14 and describes the interactions between a client and the data channel sever 14 to learn about the data referenced by a document 110 and to extract the information through the data channel server 14 interface, as well as register for updates that the data channel server 14 may receive. As is shown in FIG. 34, the data channel server 14 includes a conference 102. Within each conference 102 there are multiple data channels. Each data channel includes a data model. Each data model represents multiple data items having multiple extended properties. Each data model maintains the current version of each of its data items. When a client data viewing tool 18 is started, the desktop manager provides a handle to a viewer within the client data viewing tool 18. The viewer includes a view which includes an item presentation. The view maintains the most recently received version of the data model obtained by the client data viewing tool 18 from the data channel server 14. In this regard, the client data viewing tool 18 gets the data model from the data channel server 14 and registers with the data channel server 14 to be informed of events that the data channel receives from the data model. The next step undertaken by the client data viewing tool 18 is to get the DAG definition of the properties of each data item. In this regard, the client data viewing tool 18 asks the data channel server 14 for only the information needed for rendering its display. Next the client data viewing tool 18 gets all of the changes to the data model. Then, as events are received, the client data viewing tool 18 asks for any updates to the data model since the last version of the data model was obtained from the data channel server 14.

Several features of the present invention are applied to reduce a required network bandwidth for collaboration and to reduce data copying across the network. These mechanisms avoid some known performance problems with distributed object systems.

First, the repository sets policies to access the data it manages. This allows "lazy evaluation" of queries, postponing actual querying until the data is needed. The repository also has control of how many queries are supported, the ability to bundle updates, and the ability to limit the amount of data retrieved in a collection. Typically, the repository is placed topologically and computationally close to the data source to minimize network usage between the data source in the repository.

The feature collection is implemented as a CORBA proxy, that is, a token, so that no matter how many users and conferences the data is represented in, the collection itself is created and managed exactly once. The feature collection may be located topologically and computationally near the repository, where creation and updates of collections minimize network communications bandwidth and latency.

The data channel is selected via a "finder" service, which has the ability to find the best data channel manager for the particular collection and conference. The data channel uses two mechanisms to optimize its performance vis-a-vis the viewers: first, viewers receive only the features that they request, and secondly, the data changes are not sent to all subscribers immediately. Instead, version change events are sent, which viewers can manage in the best way suited to their behavioral use (e.g., ignoring events altogether, responding to at most one event every 10 seconds, displaying the availability of an update but requiring a user to take action to receive the update).

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A computer implemented collaboration system integrating legacy system components, said computer implemented collaboration system comprising:

a plurality of user terminals connected to a data network, wherein a plurality of participants accesses at least one conference within a context via said user terminals;

a data management tier including data sources, at least one of the data sources being a legacy data source;

a repository tier including repository servers, each of said repository servers being associated with one of said data sources, said repository servers accessing data items within their respective associated said data sources using access methods native to their respective associated said data sources to create at least one document including data items selected from their respective associated said data sources, said created at least one document being associated with the at least one conference by at least one of the plurality of participants;

a user interface tier including at least one client tool for displaying the accessed data items within their respective associated said data sources in client tool interfaces displayed on said user terminals;

a services tier including at least one data channel server associated with said created at least one document, said at least one data channel server being created when said created at least one document is associated with said at least one conference, said at least one data channel server including a data model and providing an interface between said repository servers and said at least one client tool, wherein said at least one client tool receives said data model from said at least one data channel server and registers with said at least one data channel server to be informed of events received by said at least one data channel server from said data model; and at least one extended property associated with each data item within said data sources, a current version of said at least one extended property being maintained within said data model of said at least one data channel server and displayed by said at least one client tool only within said at least one conference with which said created at least one document is associated, whereby the plurality of participants collaboratively access and manipulate selected data items included in said created at least one document associated with said at least one conference using said at least one client tool to solve a problem of said context, wherein said context and said problem relate to an intelligence gathering and analysis operation, wherein said created at least one document represents at least one of logistics data, signal intelligence-data, terrain data, map data, and image data.

2. The computer implemented collaboration system of claim 1 wherein said at least one extended property comprises one of a visualization property and a control property for use in displaying the data items with said at least one client tool.

3. The computer implemented collaboration system of claim 1 comprising a plurality of client tools displaying the data items within said at least one data source.

4. The computer implemented collaboration system of claim 3 wherein said plurality of client tools include a map viewer, a list viewer, and an X-Y data plotter.

5. The computer implemented collaboration system of claim 1 further comprising:

a query viewing client tool constructing queries for selecting data from said-at least one data source meeting particular criteria; and a library server providing an interface between said query viewing client tool and said at least one repository server.

6. The computer implemented collaboration system of claim 5 wherein said query viewing client tool constructs at least one of a standing query and a static query.

7. The computer implemented collaboration system of claim 1 further comprising:

a conference manager client tool managing communication between said user terminals.

8. The computer implemented collaboration system of claim 1 wherein said at least one extended property is maintained in said at least one data channel server in a directed a-cyclic graphical form.

9. The computer implemented collaboration system of claim 1 wherein said at least one repository server, said at least one client tool, and said at least one data channel server are implemented within a CORBA framework.

10. The computer implemented collaboration system of claim 1 wherein said user terminals are geographically remote from one another.

* * * * *

UNITED STATES PATENT AND TRADEMARK OFFICE
CERTIFICATE OF CORRECTION

PATENT NO. : 7,165,060 B2 Page 1 of 1
APPLICATION NO. : 09/782926
DATED : January 16, 2007
INVENTOR(S) : Foster et al.

It is certified that error appears in the above-identified patent and that said Letters Patent is hereby corrected as shown below:

<u>Column 15</u>
Line 19, delete "intelligence-data" and insert therefor --intelligence data--.

<u>Column 16</u>
Line 4, delete "said-at" and insert therefor --said at--.

Signed and Sealed this

Twenty-seventh Day of March, 2007

JON W. DUDAS
*Director of the United States Patent and Trademark Office*